US011933074B2

(12) United States Patent
Schroll

(10) Patent No.: US 11,933,074 B2
(45) Date of Patent: Mar. 19, 2024

(54) ELECTRICAL CAM LOCK WITH MANUAL OVERRIDE

(71) Applicant: The Eastern Company, Nantucket, CT (US)

(72) Inventor: Matthew Schroll, Glendale Heights, IL (US)

(73) Assignee: The Eastern Company, Naugatuck, CT (US)

( * ) Notice: Subject to any disclaimer, the term of this patent is extended or adjusted under 35 U.S.C. 154(b) by 75 days.

(21) Appl. No.: 17/591,219

(22) Filed: Feb. 2, 2022

(65) Prior Publication Data

US 2022/0243500 A1 Aug. 4, 2022

Related U.S. Application Data

(60) Provisional application No. 63/145,543, filed on Feb. 4, 2021.

(51) Int. Cl.
*E05B 47/00* (2006.01)
*E05B 83/00* (2014.01)

(52) U.S. Cl.
CPC .. *E05B 47/0012* (2013.01); *E05B 2047/0016* (2013.01); *E05B 2047/0017* (2013.01); *E05B 2047/0024* (2013.01); *E05B 2047/003* (2013.01); *E05B 2047/0036* (2013.01); *E05B 2047/0067* (2013.01); *E05B 2047/0072* (2013.01); *E05B 2047/0084* (2013.01); *E05B 83/00* (2013.01)

(58) Field of Classification Search
CPC ................. E05B 47/0012; E05B 83/00; E05B 2047/0016; E05B 2047/0017; E05B 2047/0024; E05B 2047/003; E05B 2047/0036; E05B 2047/0067; E05B 2047/0072; E05B 2047/0084
See application file for complete search history.

(56) References Cited

U.S. PATENT DOCUMENTS 1,855,697 A * 4/1932 Sullivan ................ E05B 13/101 192/114 R
5,775,147 A * 7/1998 Wittwer .................. E05B 17/04 70/1.7
7,275,402 B2 * 10/2007 Luling ................ E05B 47/0692 70/279.1
7,439,850 B2 * 10/2008 Boulard ................ E05B 13/004 340/426.36

(Continued)

OTHER PUBLICATIONS

Industrial Hardware Distributors, Inc.; Key Cylinders; www.industrialhwe.com; 1 page.

*Primary Examiner* — Mark A Williams
(74) *Attorney, Agent, or Firm* — Leydig, Voit & Mayer, Ltd.

(57) ABSTRACT

The disclosure provides a lock with a radially extending cam that can be pivoted electrically or manually by a key. The lock resides in a housing for ease of manufacture and reduction of space, for use, as an example, as a replacement or retrofit for an existing manual cam lock. The cam extends transversely to a first axis and is manually rotatable by a key about the first axis. The cam is also rotatable about a second axis parallel to the first axis by an electrical signal to a motor or a linear actuator connected to a cam mechanism body.

12 Claims, 29 Drawing Sheets

(56) References Cited

U.S. PATENT DOCUMENTS

| | | | | |
|---|---|---|---|---|
| 7,628,047 | B2 * | 12/2009 | Lee | E05B 37/0034 70/284 |
| 8,534,102 | B2 * | 9/2013 | Andersson | E05B 47/063 70/278.3 |
| 9,222,283 | B1 * | 12/2015 | Zhang | E05B 37/0034 |
| 9,663,972 | B2 * | 5/2017 | Ullrich | E05B 65/462 |
| 10,273,715 | B2 * | 4/2019 | Roatis | E05B 47/063 |
| 10,329,795 | B2 * | 6/2019 | Roatis | E05C 3/042 |
| 10,689,881 | B2 * | 6/2020 | Wolfish | E05B 55/005 |
| 2006/0248932 | A1 * | 11/2006 | Yang | G07F 17/10 70/284 |
| 2010/0300163 | A1 * | 12/2010 | Loughlin | G07C 9/00896 70/333 R |

* cited by examiner

SECTION 8-8

ELECTRICAL CAM LOCK WITH MANUAL OVERRIDE

CROSS REFERENCE TO RELATED APPLICATION

This patent application claims the benefit of U.S. Provisional Patent Application No. 63/145,543, filed Feb. 4, 2021, which is incorporated herein by reference in its entirety.

BACKGROUND

There is a need for a lock with an outwardly extending cam that can be pivoted to and from an open or locked condition either by an electric signal or manually by a key. It is desirable to have such lock in a sealed or contiguous housing for weather resistance, ease of manufacture and reduction of space, for use, as an example, as a replacement or retrofit for an existing manual cam lock.

One application for such a lock is in conjunction with vehicle accessories. Vehicle accessories of various types provide vehicle users convenient ways to extend the usefulness of their vehicles. In many such accessories employed by users on their vehicles, the vehicle accessories include locks for securing the accessory to the vehicle and/or securing contents being stored in or on the accessories.

Many vehicle accessories include manual locks with keys that are different than the key or fob for the vehicle itself. In at least some known vehicle accessories, accessory locks are power locks. In both examples, use of the accessory manual or power locks may require users to carry more than one key or key fob along with their vehicle ignition key, if any.

A need exists in the field of lockable vehicle accessories for devices, systems, and methods for remotely locking and unlocking vehicle accessory locks that provide users more convenience, that are weather resistant, less expensive and less time-consuming to install, that are easier to operate and maintain, that require fewer modifications to vehicles to which they are attached and/or to the vehicle accessories themselves, and which make attaching the vehicle accessories to vehicles less likely to violate vehicle warranty conditions.

Needs exist in many other fields for an electrical cam lock with a manual override, especially one that can be retrofitted in the current space occupied by a strictly mechanical cam lock, for example in cabinets and file cabinets to control the opening and locking of doors, panels and drawers. For a further example, in a hospital or an assisted living facility, a medical cart may be filled with numerous drugs for various patients in a ward, and must be locked and unlocked by the attending nurse as he makes his rounds. An electrical lock that could be actuated by a fob, keypad, smart phone or proximity sensor could be useful in not requiring the mechanical use of a key in certain situations.

SUMMARY

In one embodiment, the invention provides a pivoting electrical cam lock comprising a base with a cylindrical open bore defining a first axis, a rotating mechanical lock in the bore having a keyway at one end and an actuator at the opposite end, with the mechanical lock adapted so that when a proper key is inserted into the keyway and rotated, the lock and actuator rotate within the bore with the key. A cap is fixed to the actuator and is adapted to rotate about the first axis with the actuator and lock. The cap has a cylindrical second bore defining a second axis parallel to and preferably offset from the first axis. A cam extends transversely from the cap and is adapted to rotate about the first axis with the cap upon rotation of the proper key. A linear actuator is fixed to the cap, with the linear actuator adapted to linearly move an arm transversely to the second axis inwardly or outwardly in response to an electrical signal. A cam mechanism body with a first end contacting the arm and a second end contacting the cam is adapted so that the cam pivots about the second axis in response to linear movement of the linear actuator arm in response to the electrical signal.

In one embodiment, the cam has first and second substantially flat sides with a first pin having a circular diameter and a longitudinal axis coaxial to the second axis and depending from the first side with the first pin pivotally located in the cap second bore. The cam second side has a second pin also having a longitudinal axis parallel to and offset from the second axis, and depending from the second side. The cam mechanism body comprises a cam follower plate with a circular bore on one side and an angled racetrack shaped bore on the opposite side for pivoting the cam about the second axis.

In another embodiment, the invention provides a pivoting electrical cam lock comprising a base with a cylindrical open bore having a first end and a second end and defining a first axis, a rotating mechanical lock in the bore having a keyway at one end proximate the bore first end and an actuator at the opposite end proximate the bore second end, with the mechanical lock adapted so that when a proper key is inserted into the keyway and rotated, the mechanical lock and actuator rotate with the key about the first axis in the base bore. A cap is fixed to the actuator and is adapted to rotate about the first axis with the actuator and lock, with the cap having a small cylindrical second bore defining a second axis parallel to and offset from the first axis. A cam radially extends from the cap, the cam having a first side and a second side and a cylindrical aperture extending through the cam from the first side to the second side, with the aperture coaxial with the second axis. A rotating electric motor has a drive shaft extending outwardly therefrom, with the drive shaft extending into the cap second bore and having a longitudinal axis coaxial with the second axis. The drive shaft is adapted to rotate in response to an electrical signal to the motor. The cam is adapted to pivot about the first axis with the cap upon rotation of the proper key in the mechanical lock, and the cam is adapted to pivot about the second axis in response to the electrical signal to the motor.

In one embodiment, the cam first side has a roughened portion adjacent the aperture, and the drive shaft has a non-circular outer diameter. A slip clutch has a disc rotatingly driven by the drive shaft. The slip clutch disc has an aperture of complementary shape to the drive shaft so the slip clutch rotates with the drive shaft. The slip clutch disc has a second side biased against the cam first side, with the disc second side also having a roughened surface that cooperates with the roughened surface on the cam first side to rotate the cam in response to the electrical signal.

In one embodiment, the slip clutch disc second side is biased against the first side of the cam by a helical spring coaxial with the drive shaft.

The devices, systems, and methods for remotely locking and unlocking vehicle accessories disclosed herein provide users a number of beneficial technical effects and a more desirable user experience as compared to known vehicle accessory locks. Such benefits include, without limitation, greater convenience, being less expensive and less time-consuming to install, being easier to operate and maintain, requiring fewer modifications to vehicles to which they are attached and/or to the vehicle accessories themselves, and making attaching the vehicle accessories to vehicles less likely to violate vehicle warranty conditions.

Further and alternative aspects and features of the disclosed principles will be appreciated from the following detailed description and the accompanying drawings. As will be appreciated, the principles related to devices, systems, and methods for remotely locking and unlocking vehicle accessory locks are capable of being carried out in other and different embodiments, and are capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
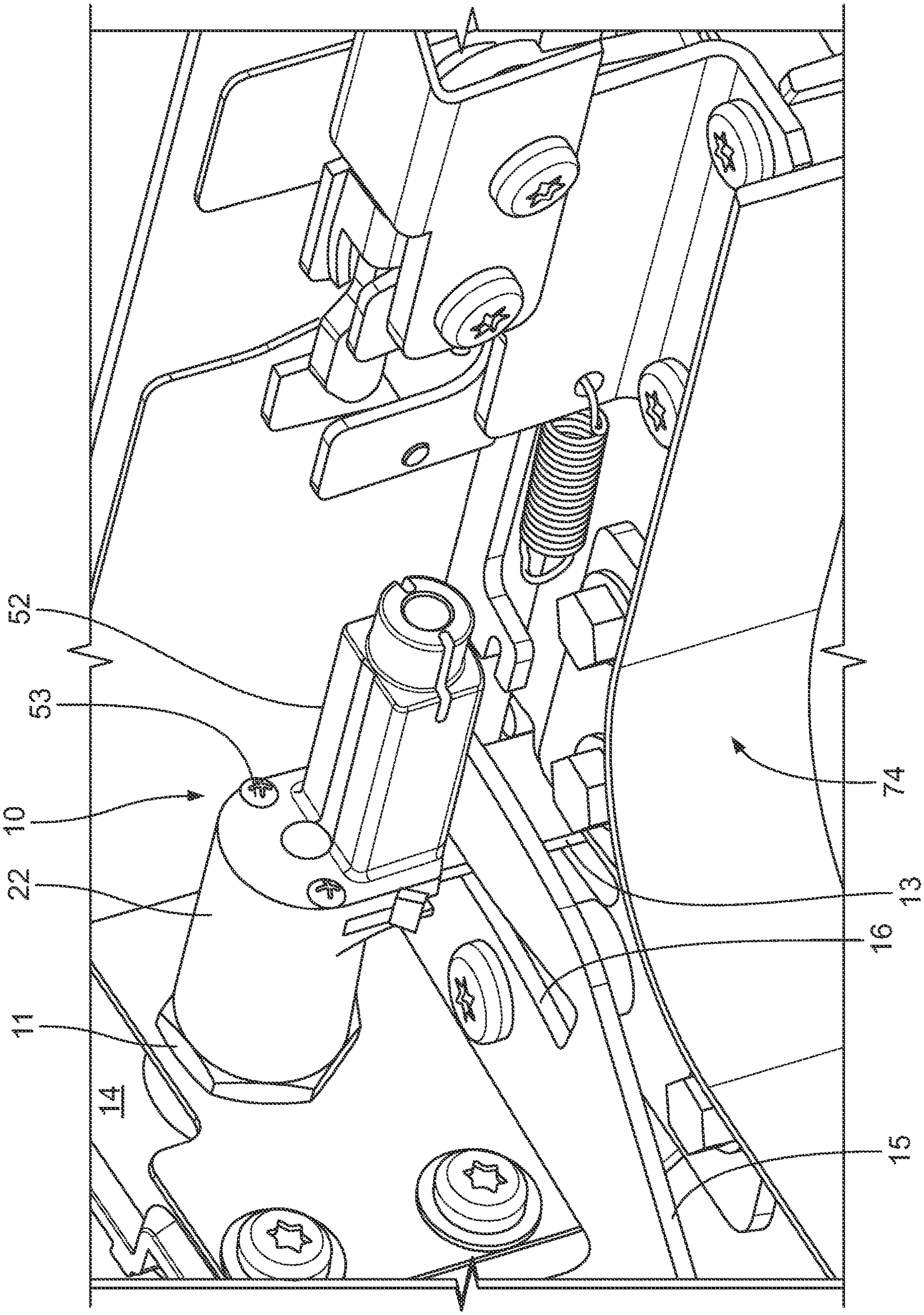
FIG. 1 is a perspective view of one embodiment of the inventive electrical cam lock in an automotive environment in the locked condition.
Figure 2:
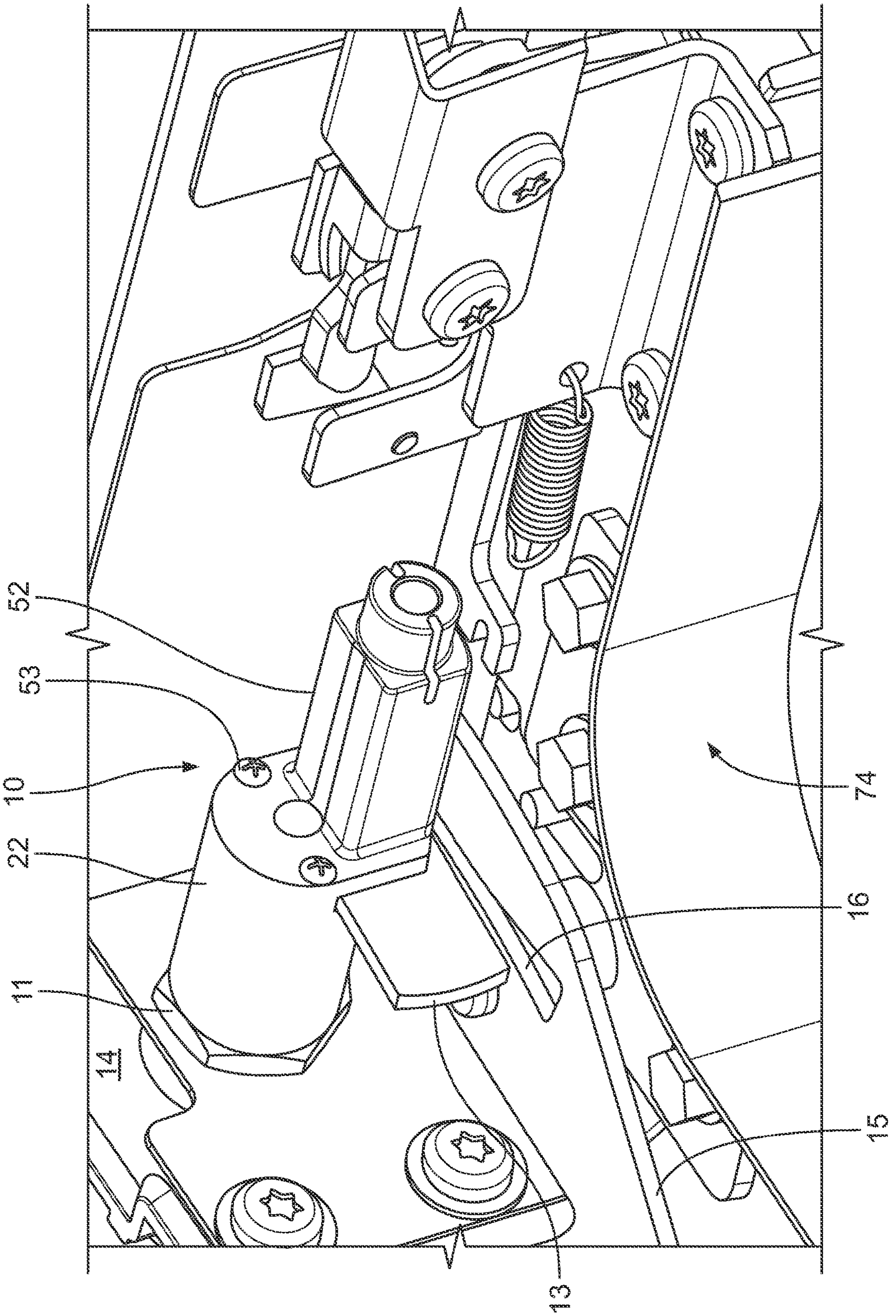
FIG. 2 is a perspective view of one embodiment of the inventive electrical cam lock in an automotive environment in the unlocked condition caused by rotation of the cam by an electrical signal.
Figure 3:
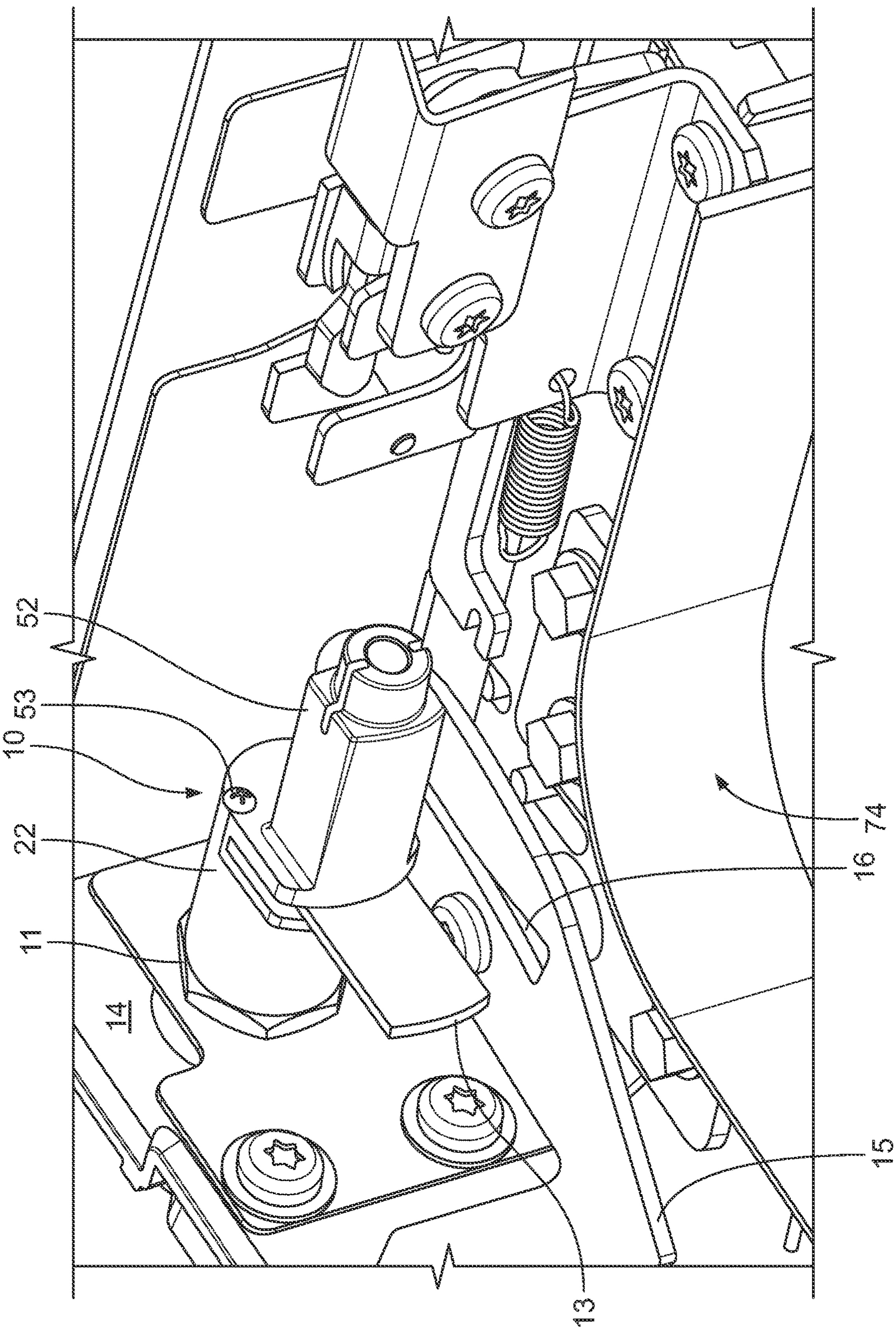
FIG. 3 is a perspective view of one embodiment of the inventive electrical cam lock in an automotive environment in the unlocked condition caused by manual rotation of the cap of the lock.

FIGS. 1-3 show one embodiment of the inventive pivoting electrical cam lock with mechanical override 10 in an automotive vehicle 74 environment locking and unlocking a vehicle accessory door 14 in two independent ways. The cam lock 10 comprises a base 11, a cap 22 and a generally flat-sided cam or blade 13 extending radially from the cap 22. In FIG. 1, the accessory door 14 is locked closed to a vehicle 74 by the cam lock cam 13 being captured in a slot 16 associated with a door opening latch mechanism 15 for the accessory of the vehicle. In FIG. 2, the accessory door is free to open upon operation of the latch mechanism 15 because the cam 13 has been moved out of the slot 16 by pivoting the cam about a second axis 25 (not shown) in response to an electrical signal and the latch mechanism 15 is free to move. In FIG. 3, the accessory door is free to open upon operation of the latch mechanism 15 because the cam 13 has been moved out of the slot 16 by pivoting the cap 22 about a first axis 67 (not shown) in conjunction with rotating a key 72 (See FIGS. 24-27) inserted into a keyway 18 on the opposite side of the door 14 wall. The key operates a mechanical lock 71 in the base 11, causing the cam 13, along with the cap 22, to rotate out of slot 16 so the latch mechanism 15 is again free to move.

Figure 24:
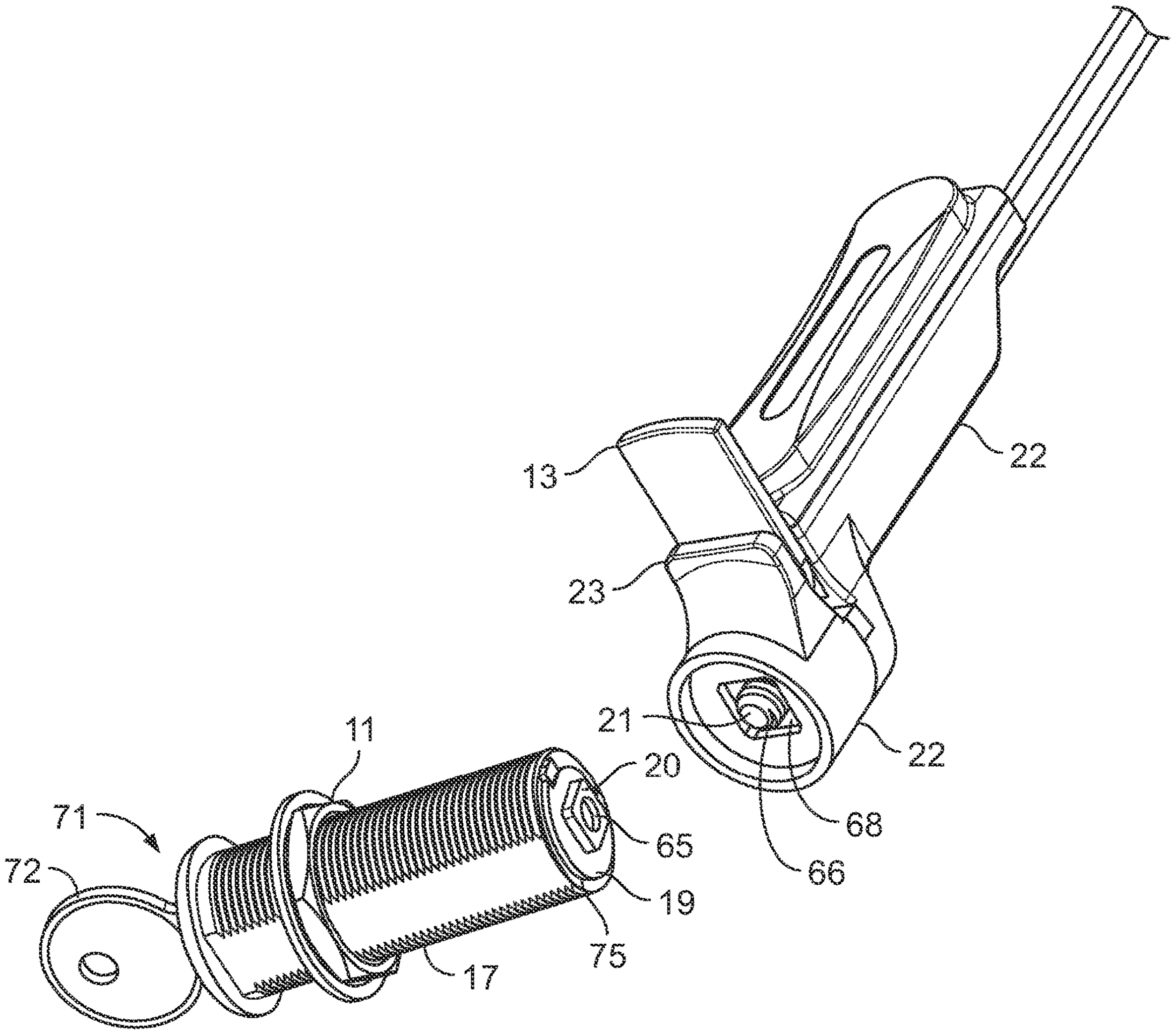
FIG. 24 is a stylized exploded view of another embodiment of the cam lock.
Figure 25:
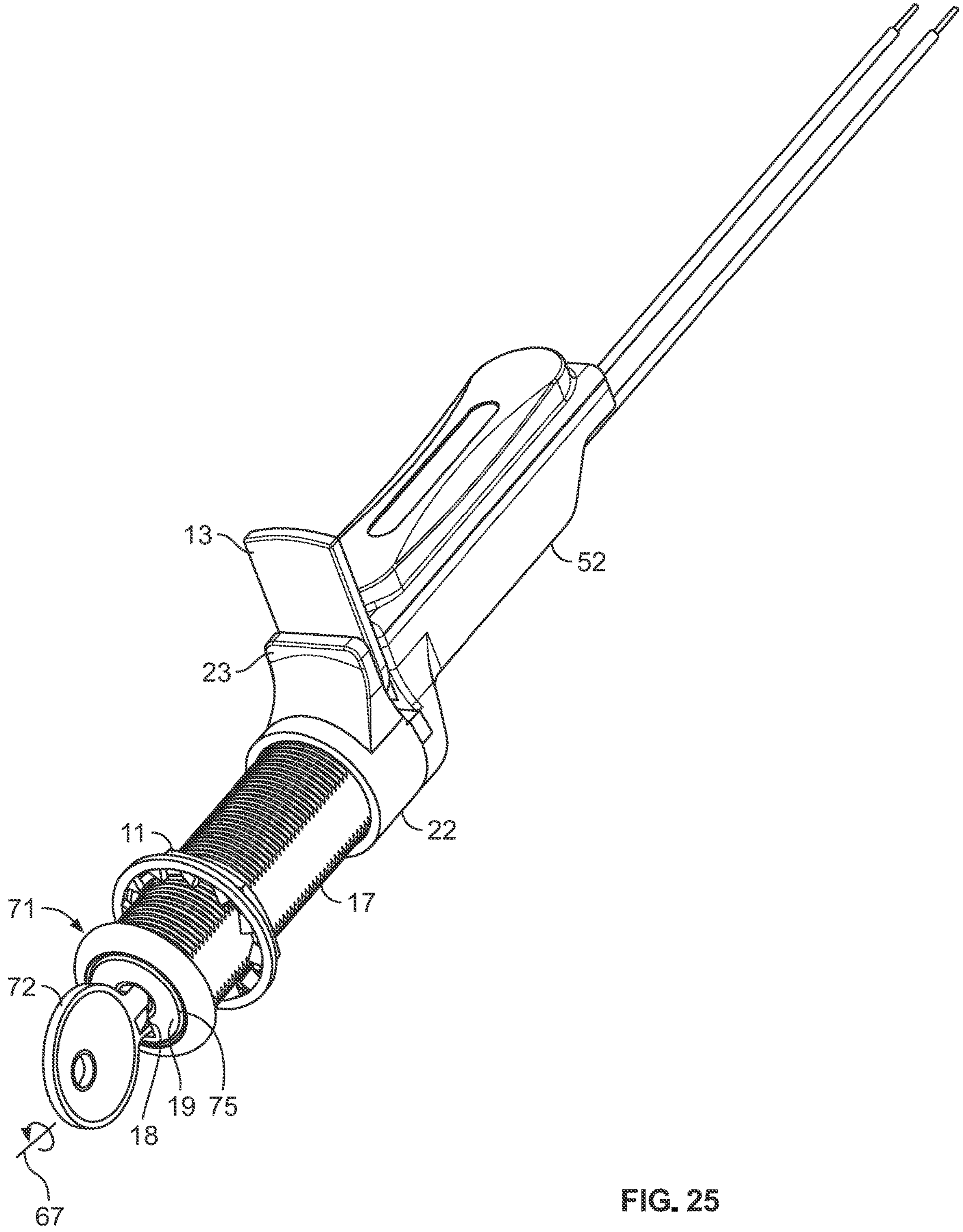
FIG. 25 is a perspective view of another embodiment of the cam lock in the parallel locked condition.
Figure 26:
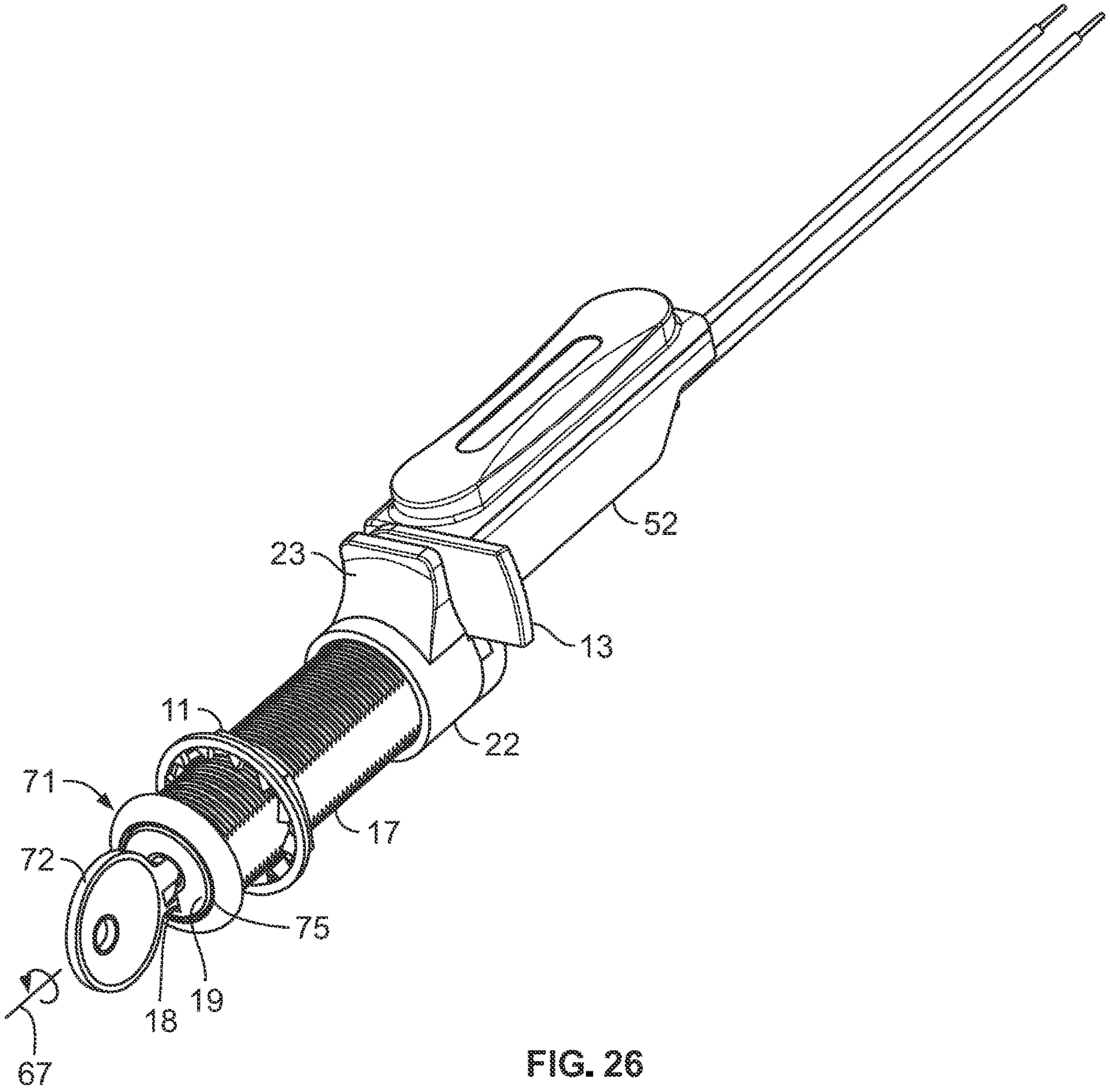
FIG. 26 is a perspective view of another embodiment of the cam lock in the right angle open condition from actuation by an electrical signal.
Figure 27:
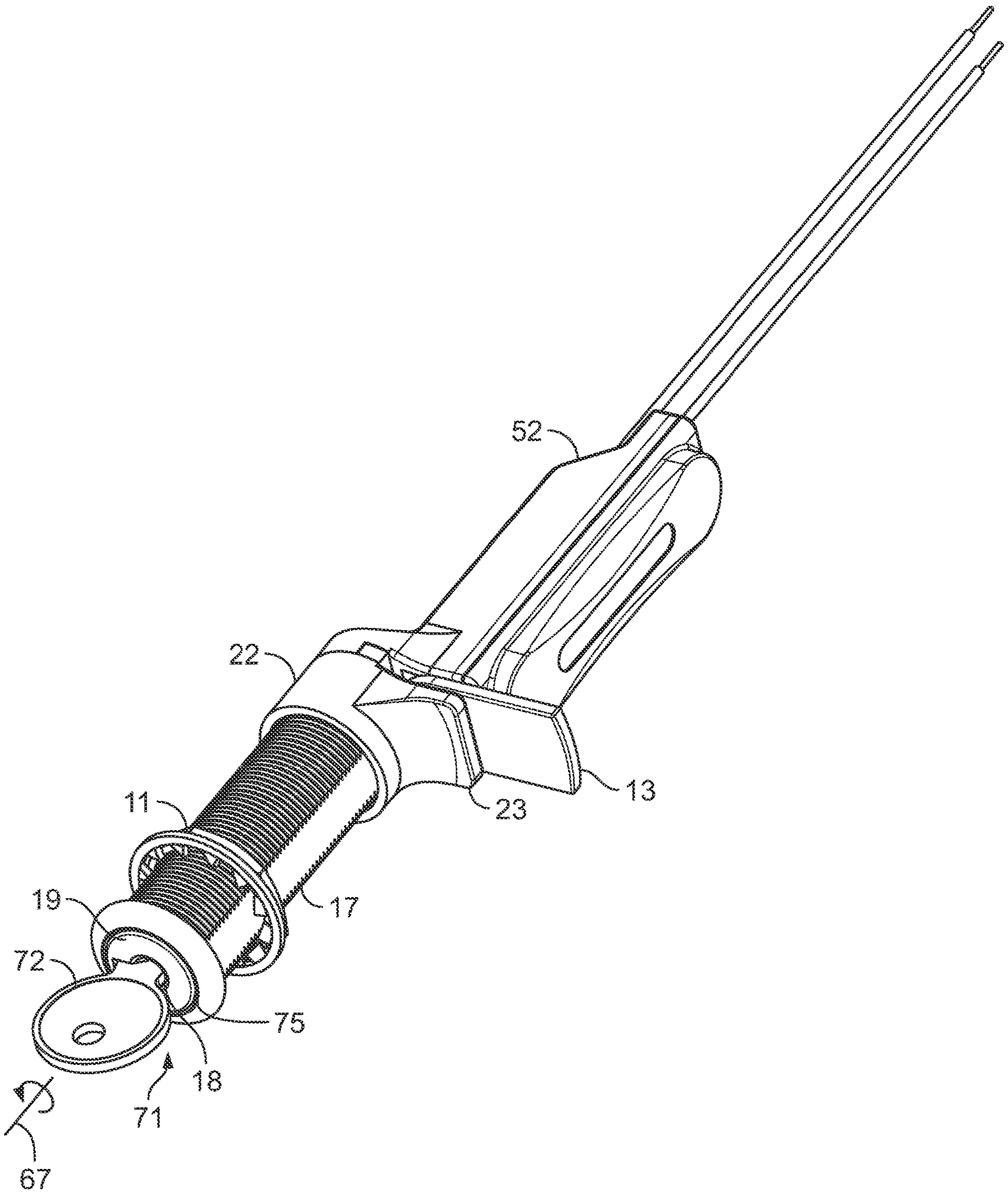
FIG. 27 is a perspective view of another embodiment of the cam lock in the open condition through mechanical rotation of a key.

An embodiment of the inventive pivoting cam lock 10 has a base 11 and a cap 22. As can be seen in FIGS. 4, 5, 13 and 14, the base 11 has a fixed portion 17 that is attached to a first structure so that the lock cam 13 can be selectively moved into and out of slot or behind a wall of a second complementary structure such as a door similar to that shown in FIGS. 1-3. As shown in FIGS. 24-26, a keyway 18 is located at one end of the fixed portion 17 that is ultimately located on the outside the first structure to accommodate a key 72. The interior of the base or fixed portion 17 defines a substantially cylindrical open bore 75 preferably with longitudinal splines to define a first axis 67 and accommodates a mechanical lock 71 such as a tumbler lock. When the proper key 72 is inserted into the keyway 18, tumblers in the tumbler lock are retracted, and the key 72 and plug 19 is allowed to rotate about the first axis 67. Examples of tumbler locks that can be used in this application include those found in U.S. Pat. No. 5,964,110 and co-pending U.S. patent application Ser. No. 16/439,033 the disclosures of which are fully incorporated herein, as well as other serrated key and blade key tumbler style locks in which a plug with a plurality of tumblers is able to rotate about a first axis 67 from a locked or unlocked condition in a barrel or housing by using an appropriate key.

The rotatable portion or plug 19 of the lock 71 terminates in a non-circular actuator 20 that protrudes from the end of the fixed portion 17 opposite the keyway 18 and pivots or rotates about the first axis 67 in the base bore 75. In one embodiment, the actuator 20 has a square outer shape and a threaded internal blind bore 65. See FIG. 14A. The cap 22 is secured to the actuator 20 preferably by a screw 21 that extends through an aperture in the cap and is screwed into the bore 65, see FIGS. 13 and 14B. The cap 22 has internal female walls 66 that cooperate with the actuator 20 square outer shape so the cap 22 also rotates or pivots about the first axis 67 with the rotatable portion 19 and the actuator 20 upon rotation of a proper key 72 in the mechanical lock.

Figure 17:
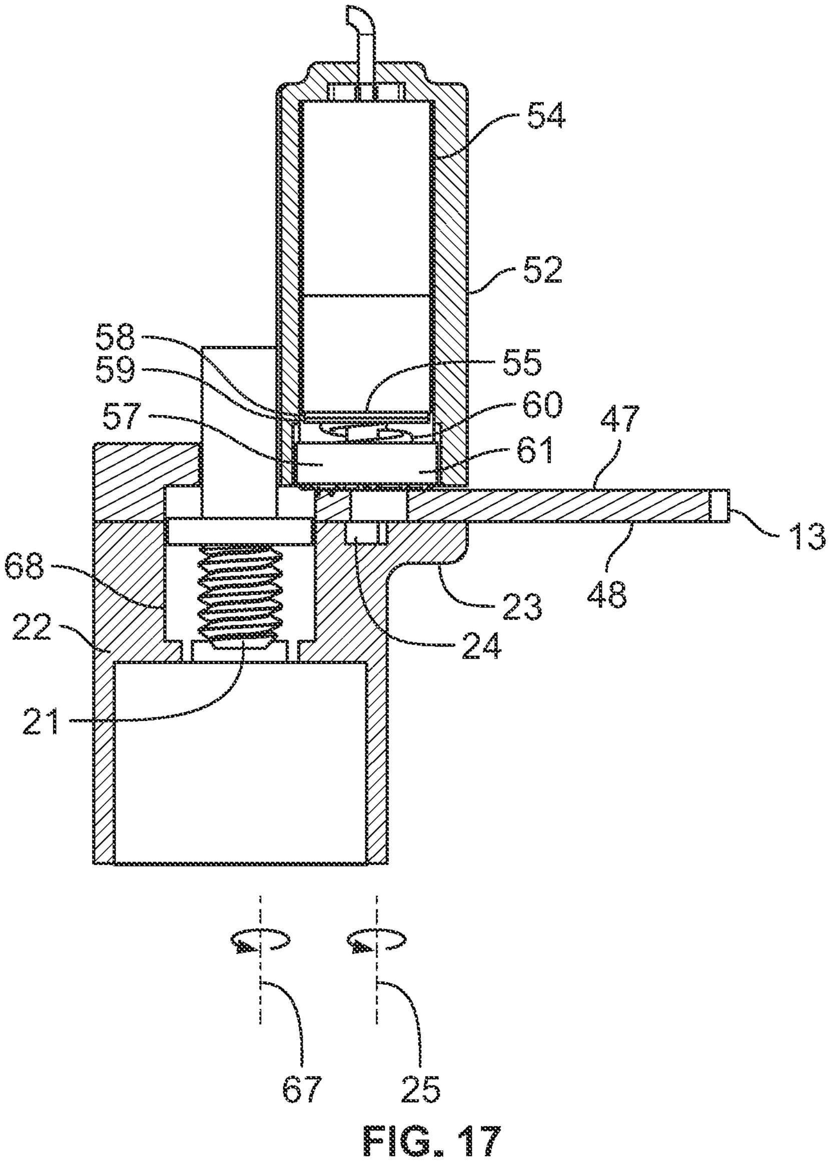
FIG. 17 is a cut away side view of a cap and cover of another embodiment of the cam lock with the cam in the parallel extended condition.
Figure 18:
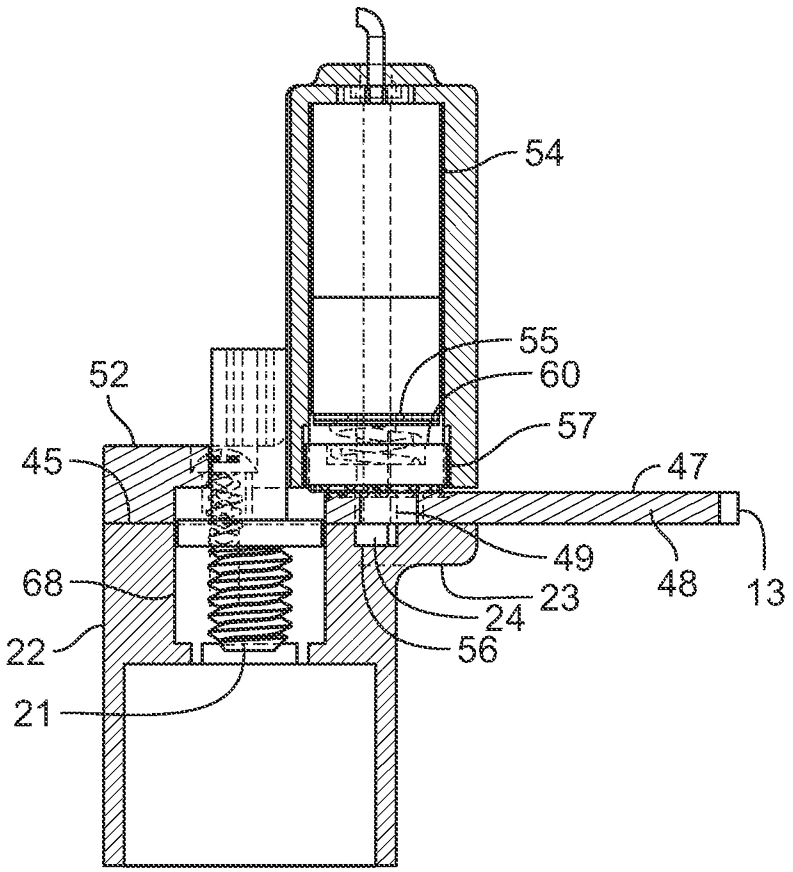
FIG. 18 is a second cut away side view of a cap and cover of another embodiment of the cam lock with the cam in the parallel extended condition.

The cap has an outwardly extending ledge 23 protruding from one side transverse to the first axis 67. The ledge has an aperture or preferably a blind bore 24 with the aperture or bore defining a second axis 25, preferably parallel to and offset from the first axis 67 (See FIGS. 13 and 17). However, other means than the screw 21 coaxial with the first axis 67 could be used to secure the cap 22 to the actuator 20 and the second axis 25 could be coaxial with the first axis 67 in another embodiment. In a preferred embodiment, the aperture or bore 24 in the cap 22 has a substantially smaller diameter than the bore 75 in the base 17.

Figure 4A:
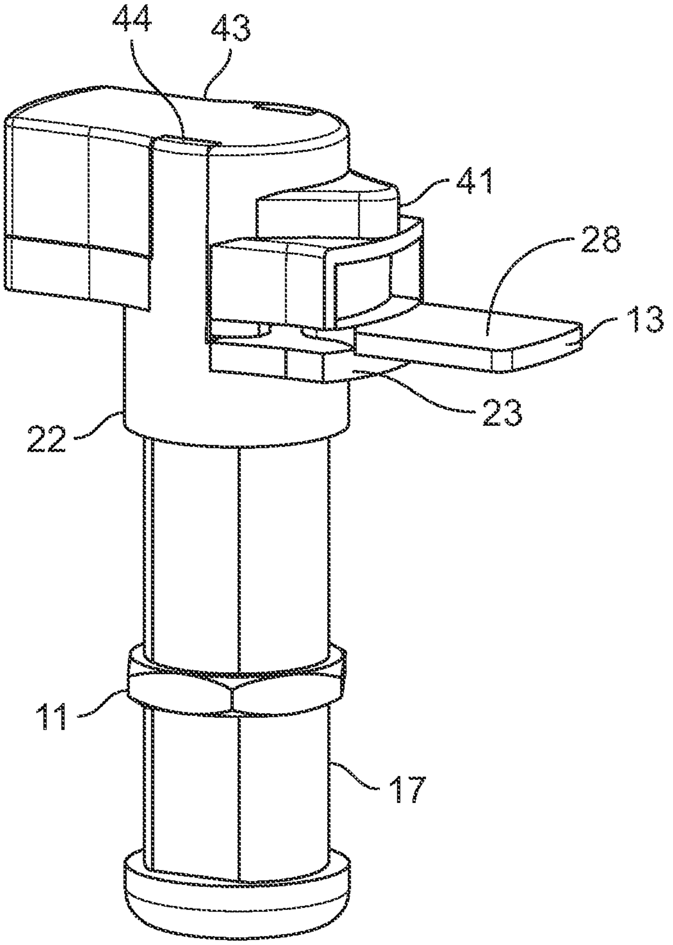
FIG. 4A is a perspective view of one embodiment of the inventive cam lock with the cam in the parallel extended condition.
Figure 4B:
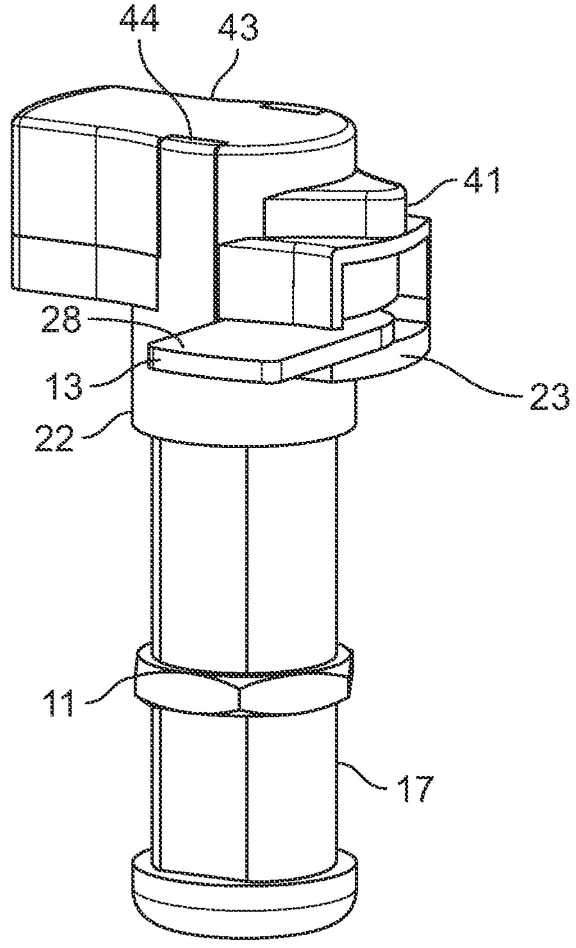
FIG. 4B is a perspective view of one embodiment of the inventive cam lock with the cam in right angle condition.
Figure 5A:
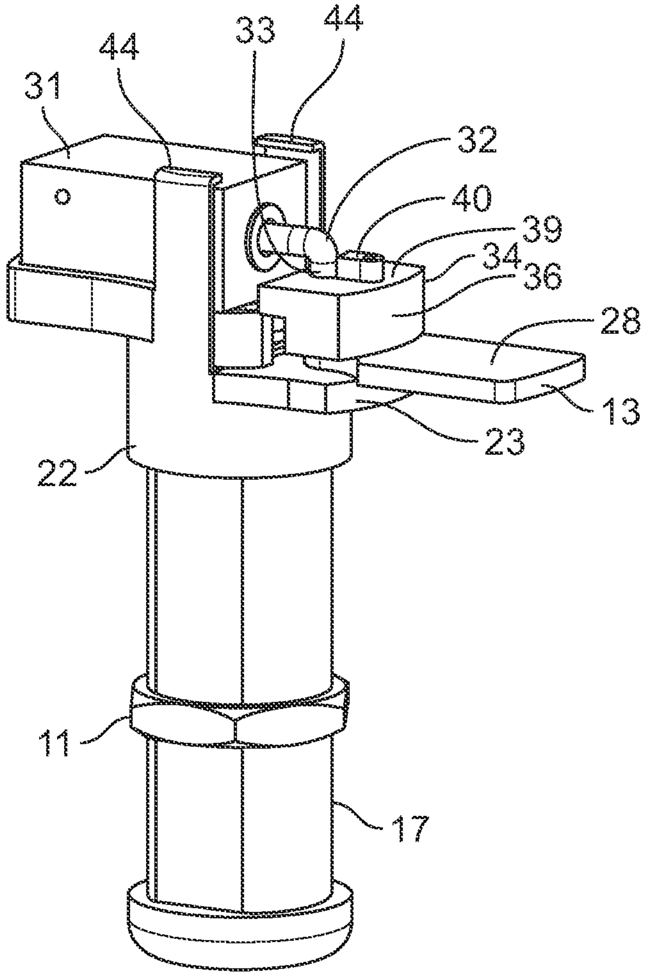
FIG. 5A is a partial cut away perspective view of one embodiment of the inventive cam lock with the cam in the parallel extended condition.
Figure 5B:
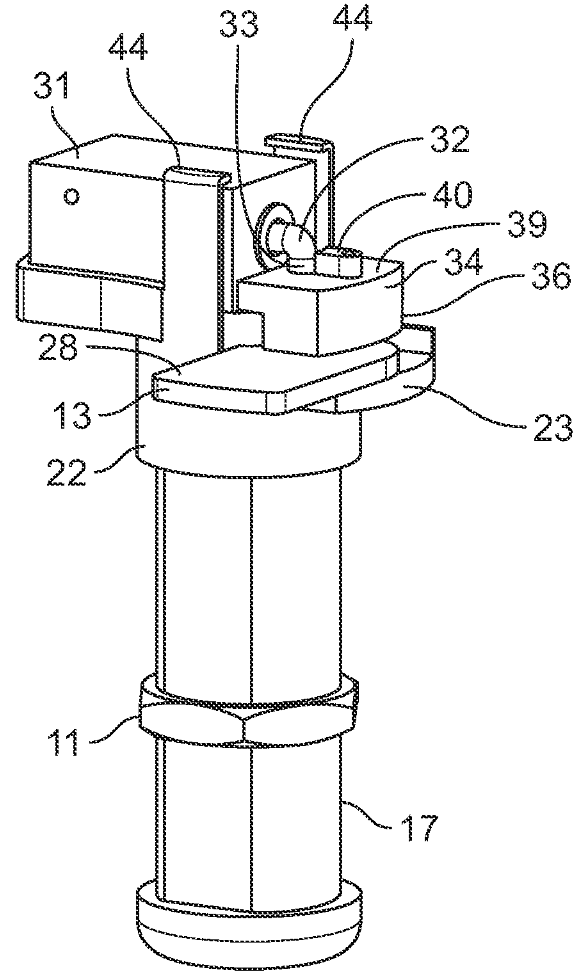
FIG. 5B is a partial cut away perspective view of one embodiment of the inventive cam lock with the cam in the right angle condition.
Figure 6A:
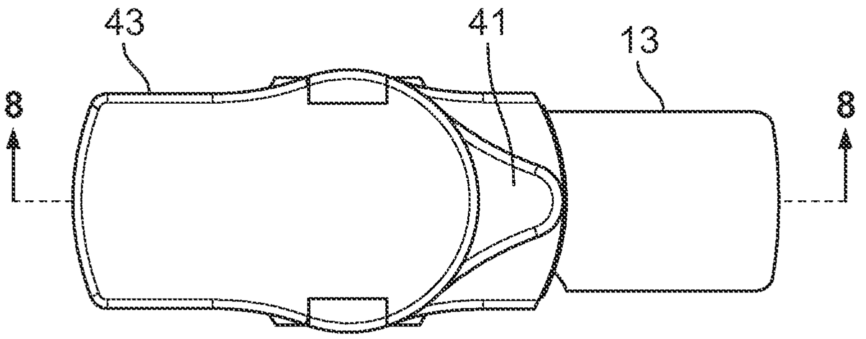
FIG. 6A is a top view of the cap of one embodiment of the inventive cam lock with the cam in the parallel extended condition.
Figure 6B:
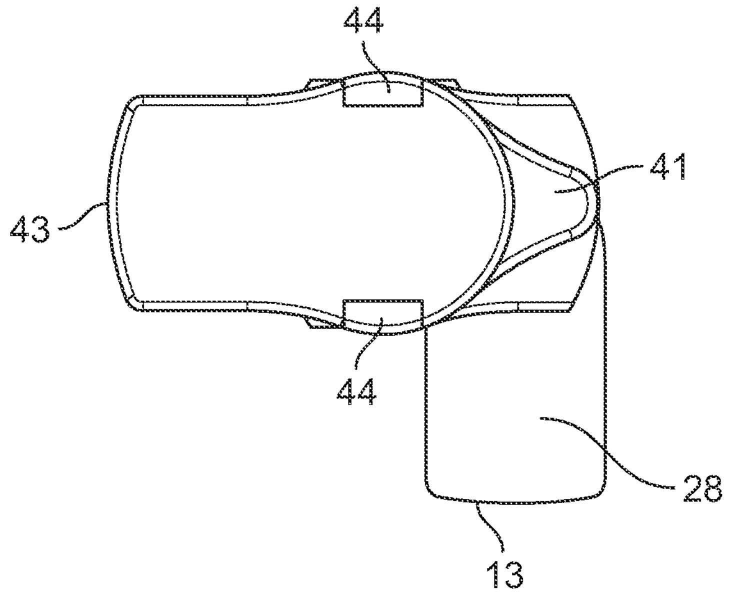
FIG. 6B is a top view of the cap of one embodiment of the inventive cam lock with the cam in right angle condition.

The cam or blade 13, having a first generally flat bottom side 27 and a second generally flat top side 28, pivotally lies on the ledge 23. In one embodiment, a small bottom pin 29 depends from the cam first side 27 near one end of the cam 13 and is accommodated in the aperture or bore 24 in the ledge 23 to allow for pivotal movement of the cam 13 about the second axis 25 with respect to the ledge 23 and cap 22. In FIGS. 4A and 5A, as with FIGS. 1, 3, 25 and 27, the cam is in an extended parallel condition, usually used for a locking condition unless the cap has been rotated about the first axis 67 by a key 71. Compare this with FIGS. 4B, 5B, 15C and 26 where the cam is in a right angle condition, usually equating to an unlocked condition in response to an electrical signal.

In one embodiment, the pivoting action of the cam 13 about axis 25 is initiated by a linear motor or solenoid 31, or similar structure such as a hydraulic or pneumatic piston, that receives a signal, preferably an electrical signal, to move a linear actuator 32 into and out of the linear motor in a plane that is at a right angle to the first 67 and second 25 axes. The solenoid or linear motor 31 is nested transversely to the first 67 and second 25 axes in a space in the cap 22, sandwiched between the cap 22 and the cover 43 by inwardly biased arms 44 that capture the cover 43. The linear motor 31 may be secured to the cap 22 or cover 43 by other means known in the art.

Figure 12A:
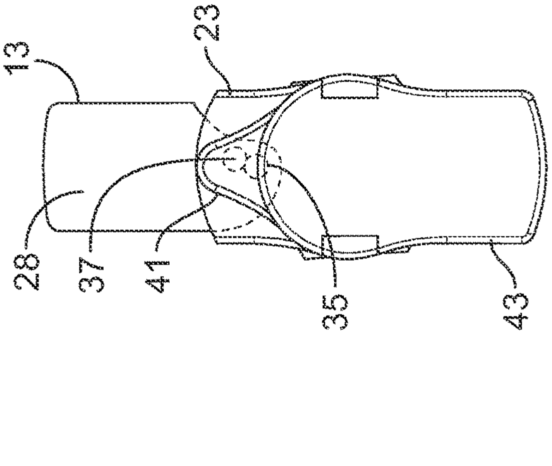
FIGS. 12A-12I are another collection of figures of partial assemblies of the cap of one embodiment of the inventive cam lock.
Figure 12B:
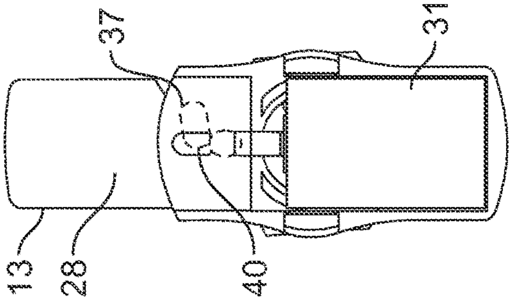
Figure 12C:
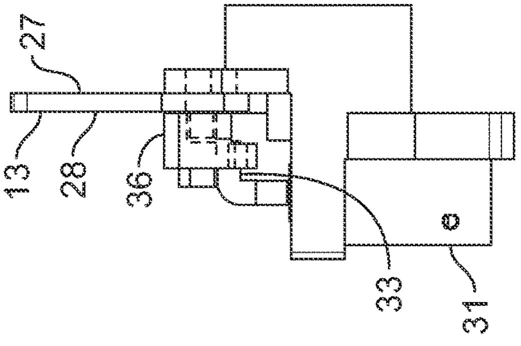
Figure 12D:
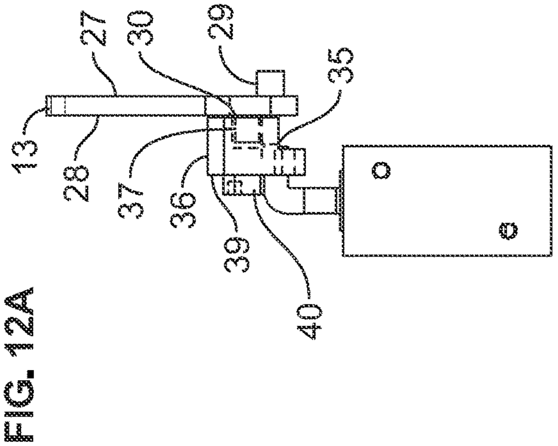
Figure 12E:
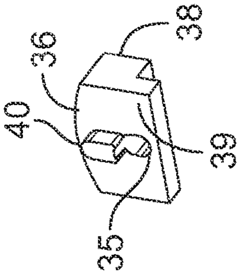
Figure 12H:
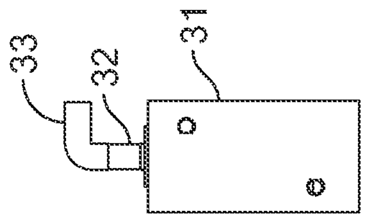
Figure 12G:
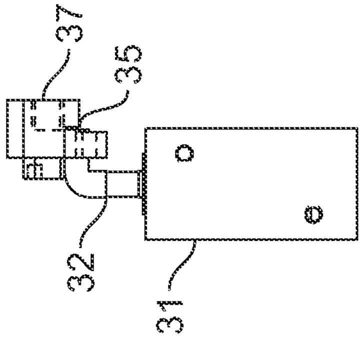
Figure 12I:
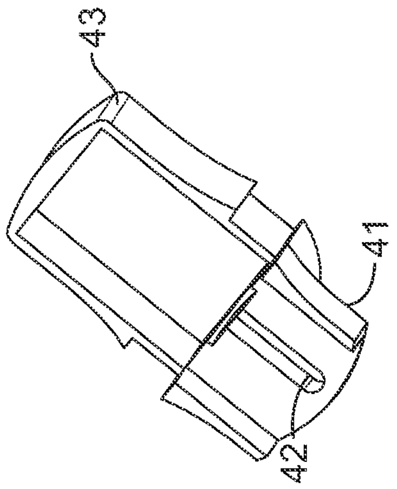
Figure 12F:
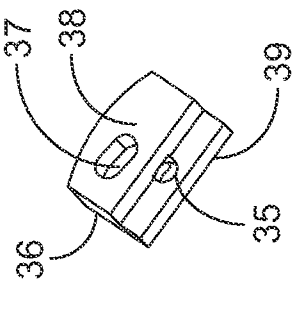
Figure 13:
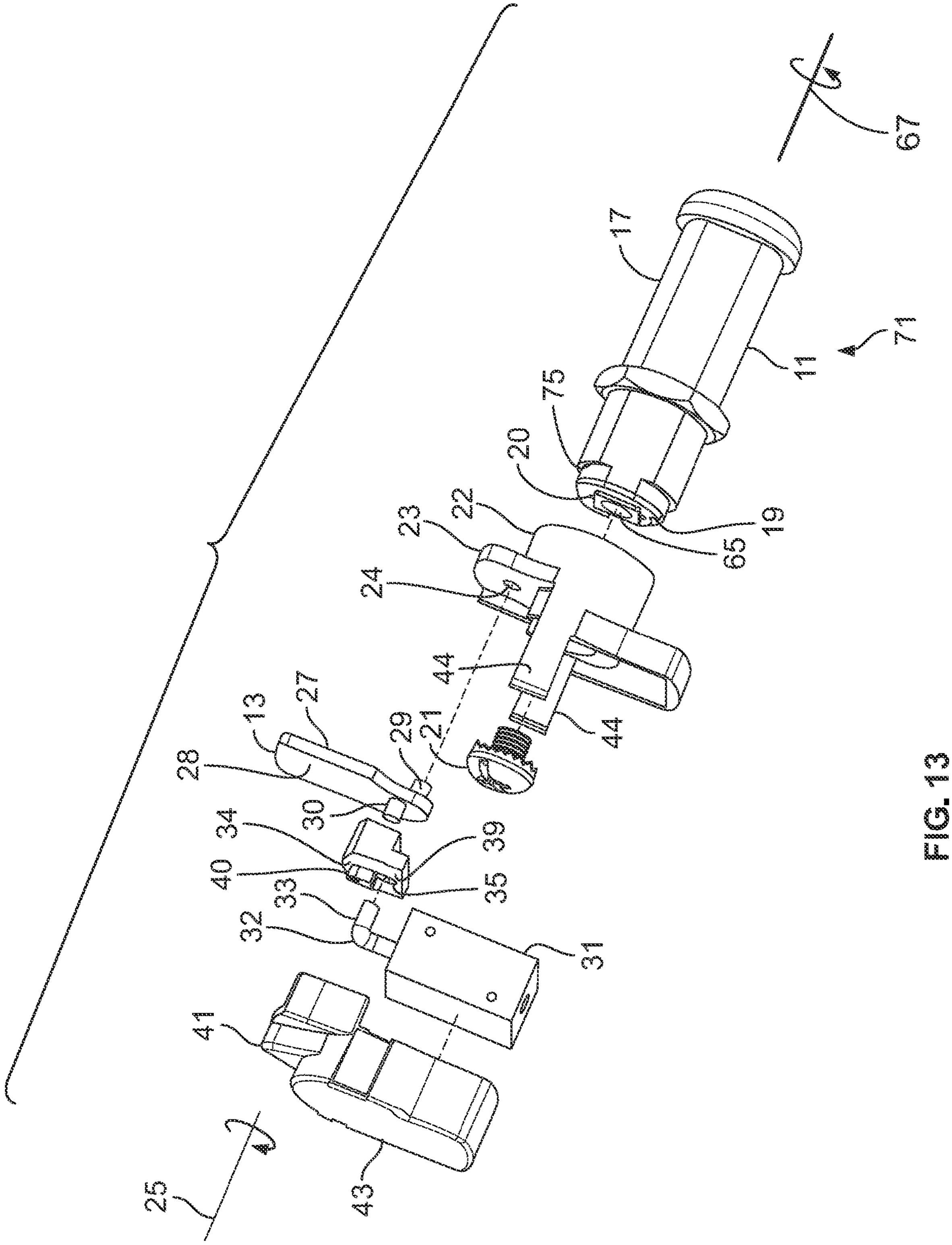
FIG. 13 is an exploded view of one embodiment of the inventive cam lock.
Figure 14A:
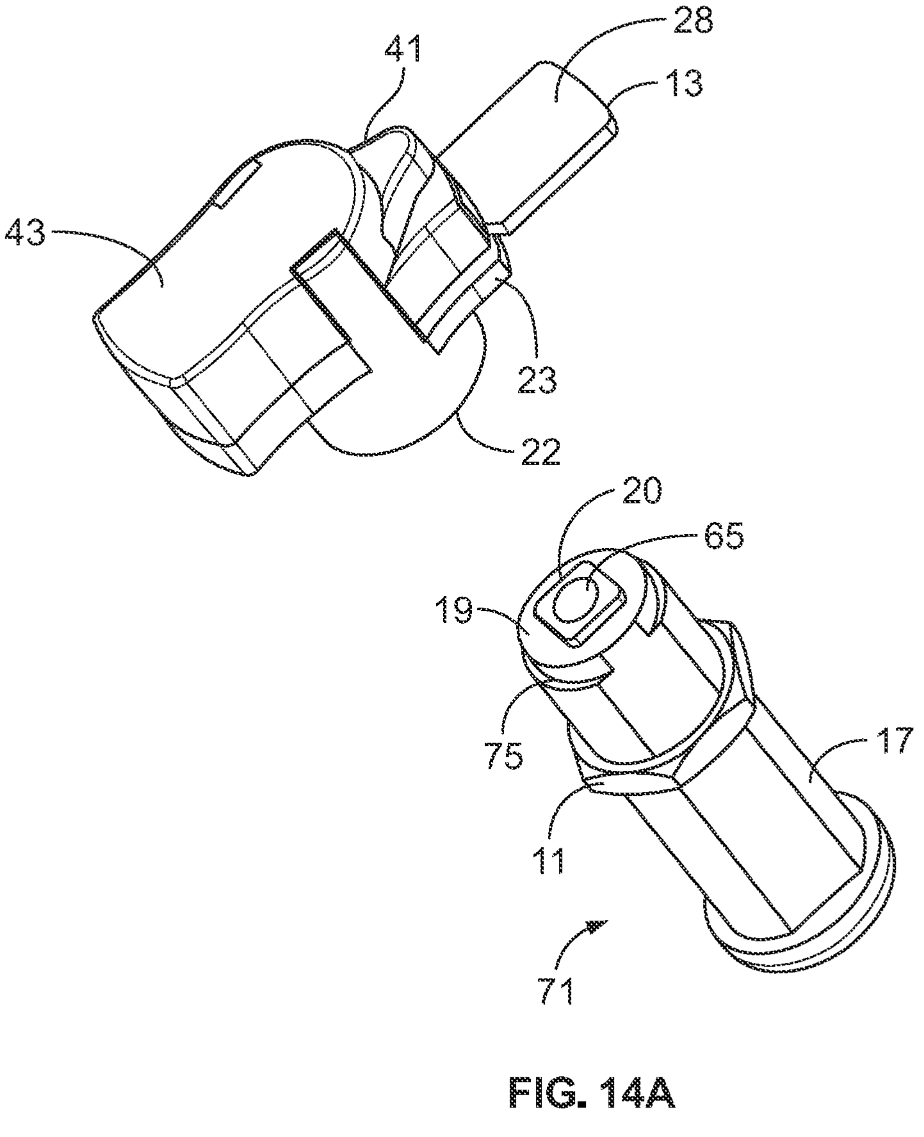
FIG. 14A is partial exploded view of one embodiment of the inventive cam lock taken from one perspective.
Figure 14B:
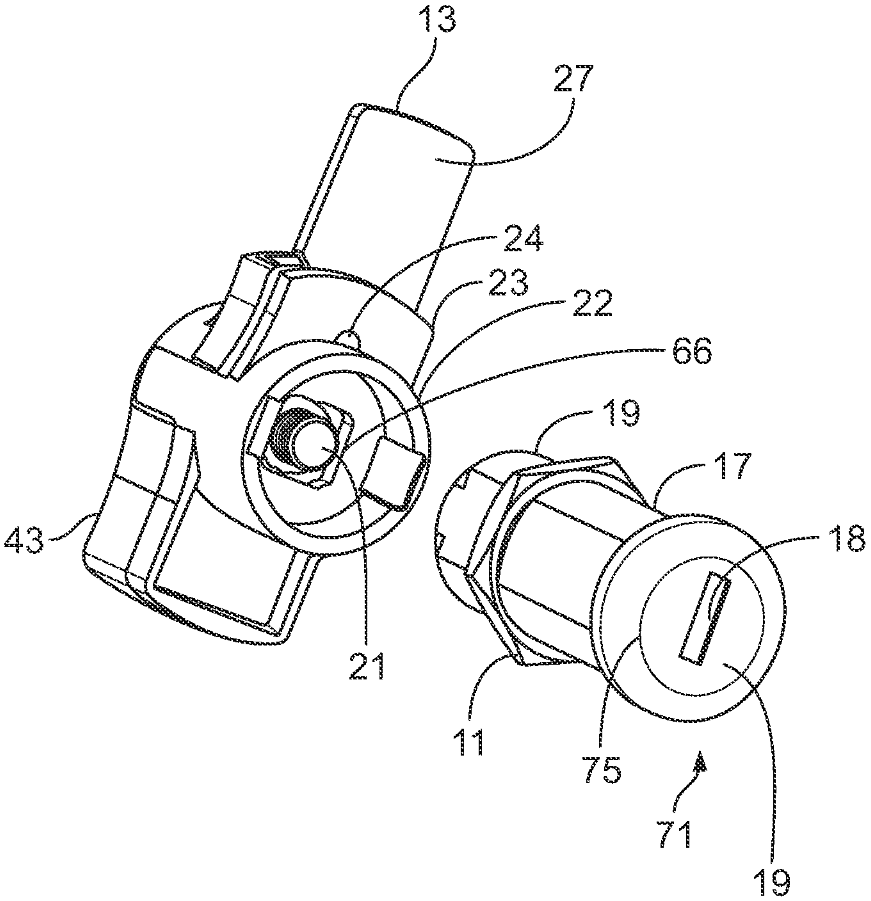
FIG. 14B is a partial exploded view of one embodiment of the inventive cam lock taken from another perspective.

The linear actuator 32 preferable comprises a bent rod with an orthogonal depending arm 33 that cooperates with a cam mechanism body 34 having a cam follower plate 36 that interacts with an upstanding pin 30 protruding from the top second side 28 of the cam 13 to translate the linear motion of the linear actuator 32 into pivotal swinging motion of the cam 13. The depending arm 33 fits into an aperture or bore 35 in the top wall of a cam follower plate 36 (See FIGS. 12E and 12F). The upstanding pin 30 of the cam is accommodated in an angled racetrack shaped bore 37 in the bottom wall of the cam follower 36, see FIG. 12F. To ensure that the cam follower 36 only moves translationally with the linear actuator 32 an upstanding elongated pin or raceway boss 40 on the top wall 39 of the cam follower 36 slides in a complementary raceway 42 in the cam cover 41, see FIG. 12I. The cam cover 41 may be a portion of the overall cover 43 of the cam mechanism 34, linear actuator 32 and linear motor 31.

The cam pivots about the second axis 25 in response to an electrical signal to the solenoid 31. The limit of the pivoting movement of the cam 13 may be limited by the edge of the cam contacting a side of the cap 22 or by the extent of the motion of the linear actuator 32. The pins in the bores substantially immobilize the cam 13 when the linear actuator 32 is stationary.

Figure 7A:
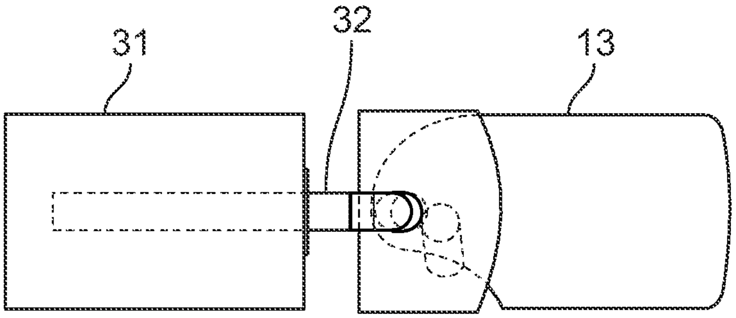
FIG. 7A is a stylized cut away top view of the cap of one embodiment of the inventive cam lock with the cam in the parallel extended condition.
Figure 7B:
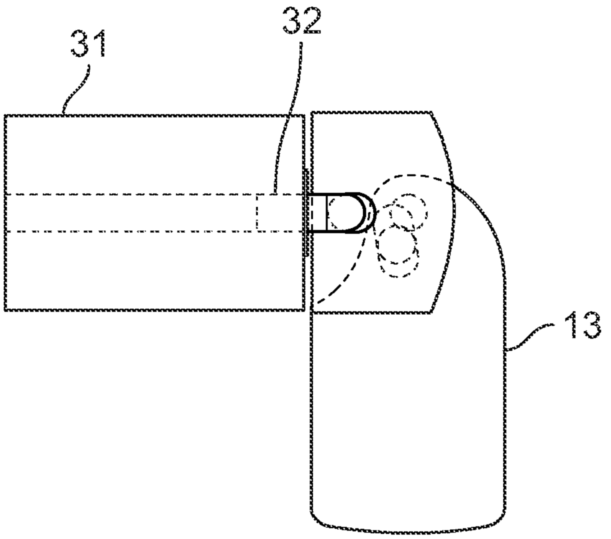
FIG. 7B is a stylized cut away top view of the cap of one embodiment of the inventive cam lock with the cam in right angle condition.
Figure 9:
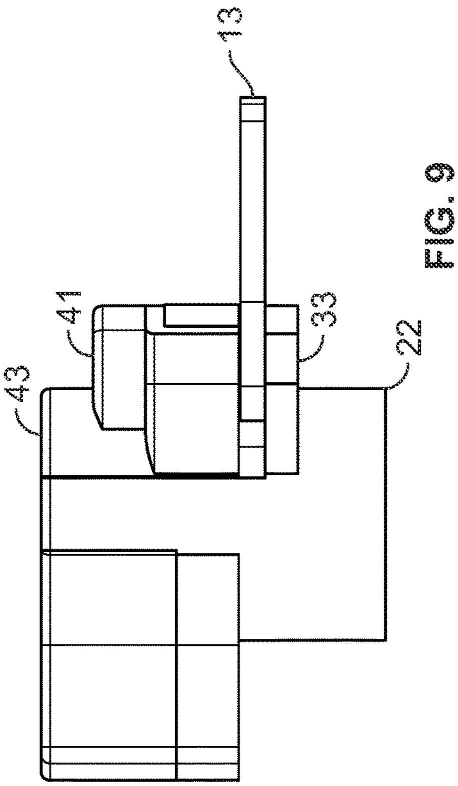
FIG. 9 is a side view of the cap of one embodiment of the inventive cam lock with the cam in parallel extended condition.
Figure 8:
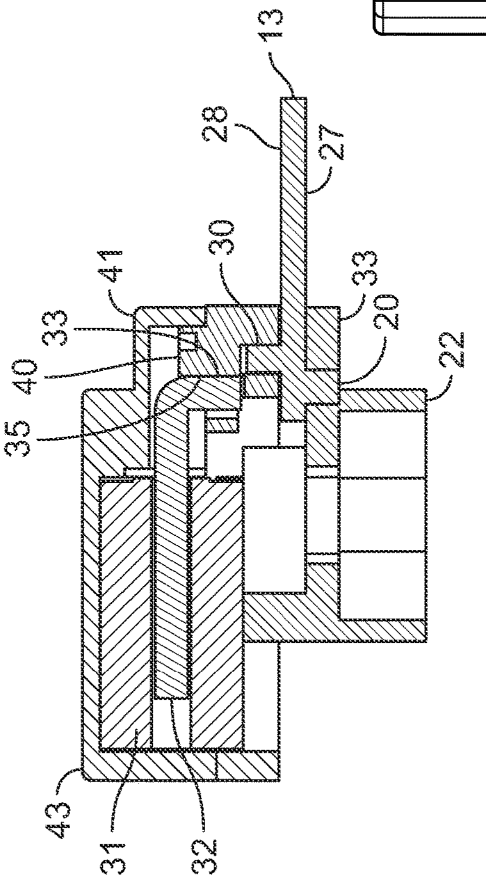
FIG. 8 is a cross section of FIG. 6A taken along lines 8-8.
Figure 10:
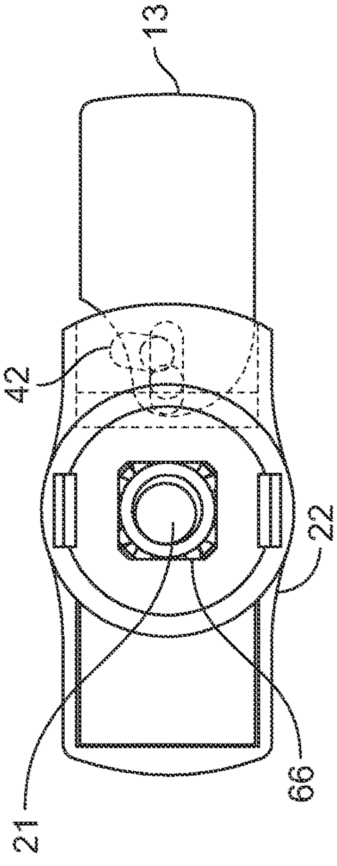
FIG. 10 is a stylized bottom view of the cap of one embodiment of the inventive cam lock with the cam in parallel extended condition.
Figure 11A:
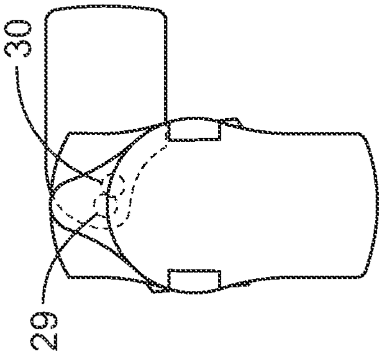
FIGS. 11A-11I are a collection of figures of partial assemblies of the cap of one embodiment of the inventive cam lock.
Figure 11B:
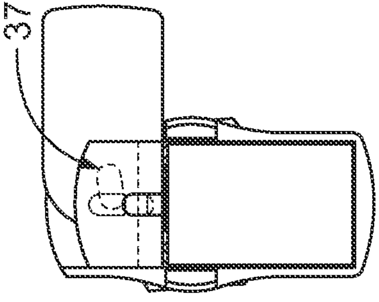
Figure 11C:
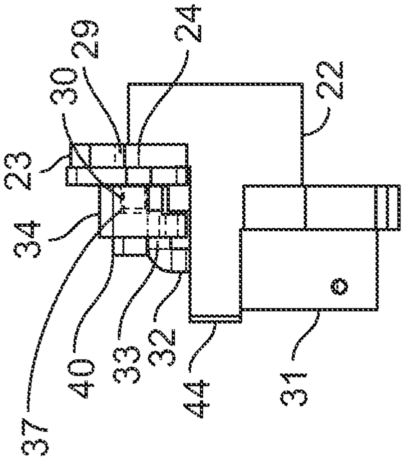
Figure 11D:
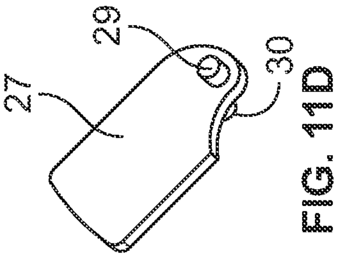
Figure 11E:
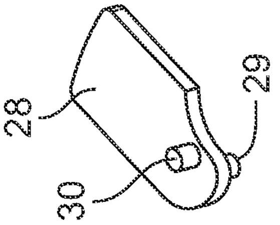
Figure 11F:
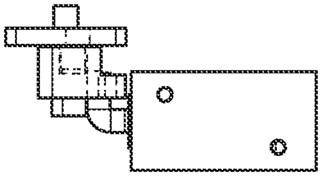
Figure 11I:
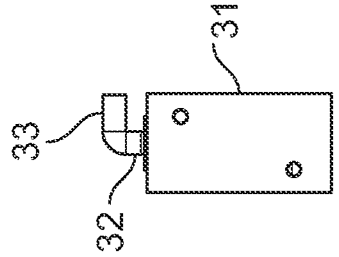
Figure 11H:
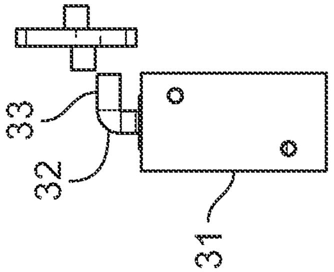
Figure 11G:
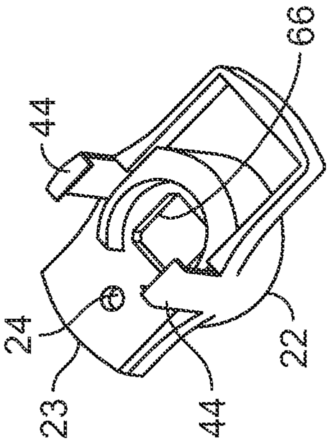

As seen in FIGS. 7A and 7B, in one embodiment, as viewed from above, when the solenoid or linear motor 31 receives a first negative electrical signal it retracts the linear actuator 32, and the cam 13 rotates in the clockwise direction to end up at a right angle to the linear actuator 32 generally used as an unlocked condition as described above. When the linear motor 31 receives a second positive electrical signal it extends the linear actuator 32, and the cam 13 rotates 90° in the counter clockwise direction to end up with the cam roughly co-linear or parallel with the linear actuator 32.

Figure 19:
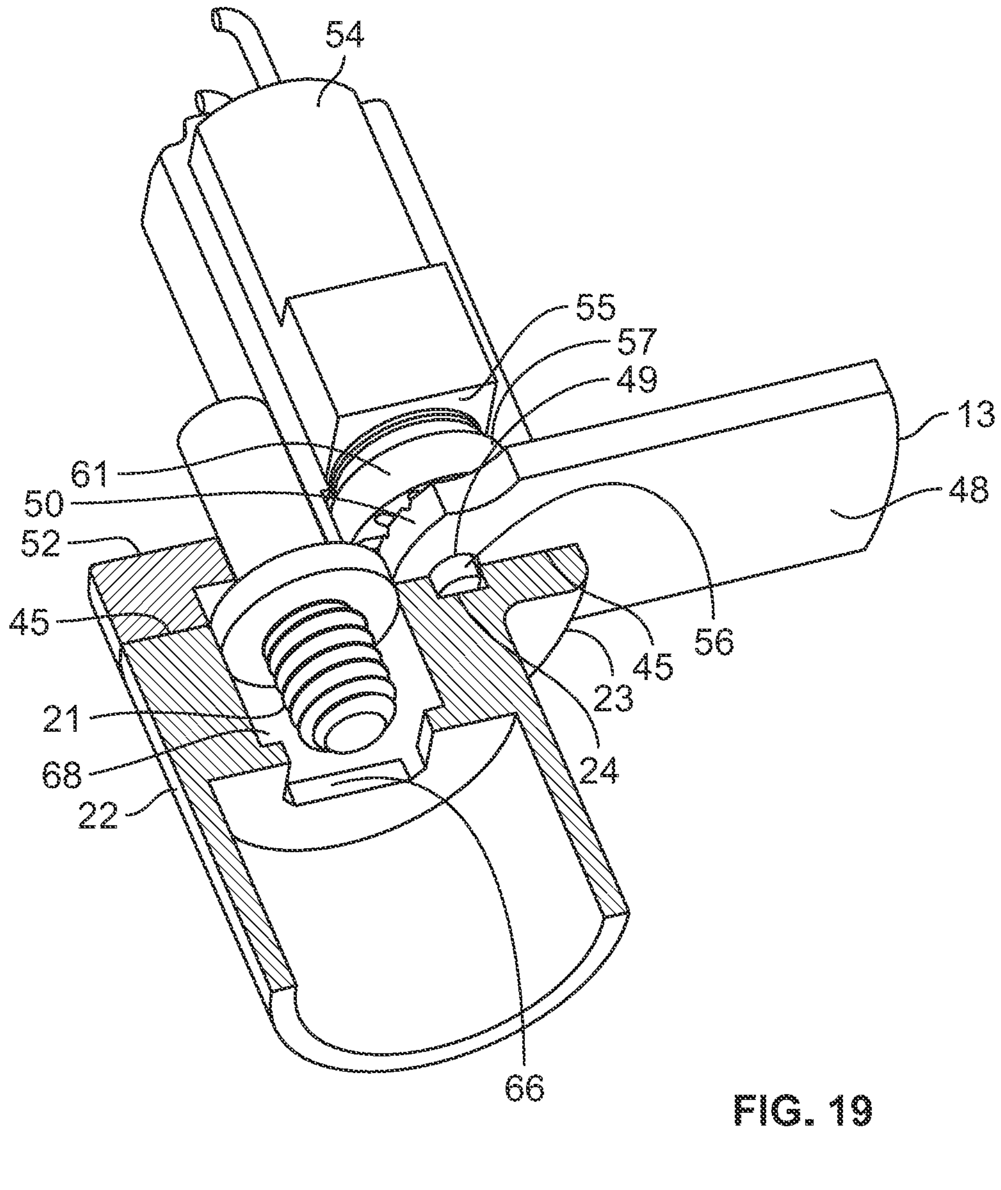
FIG. 19 is a partial cut away perspective view of a cap and cover of another embodiment of the cam lock with the cam in the parallel extended condition.
Figure 20:
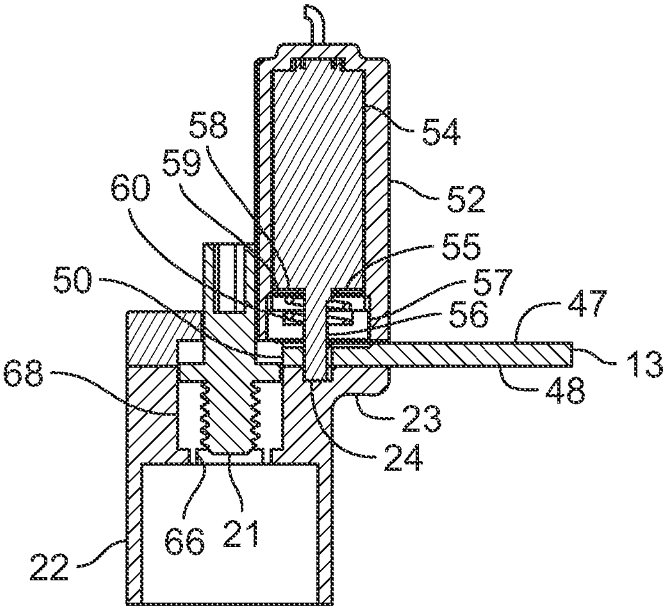
FIG. 20 is a third cut away side view of a cap and cover of another embodiment of the cam lock with the cam in the parallel extended condition.
Figure 21:
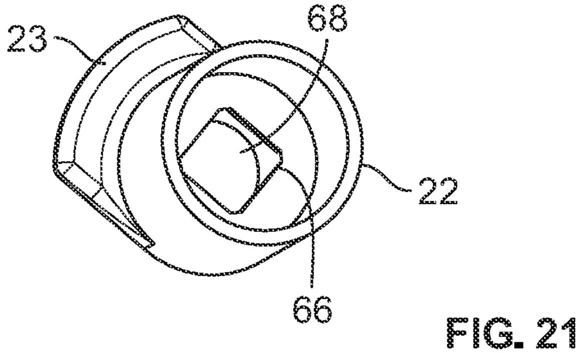
FIG. 21 is a perspective view of a portion of the cap of another embodiment of the cam lock.
Figure 22:
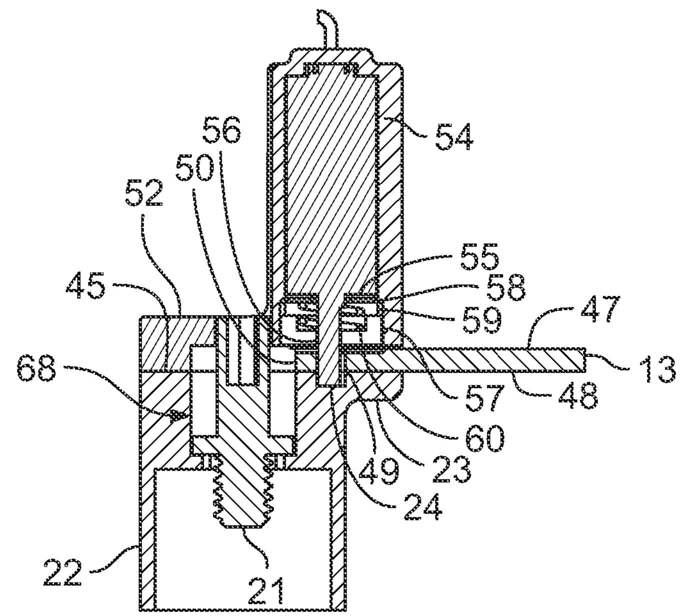
FIG. 22 is a fourth cut away side view of a cap and cover of another embodiment of the cam lock with the cam in the parallel extended condition.
Figure 23:
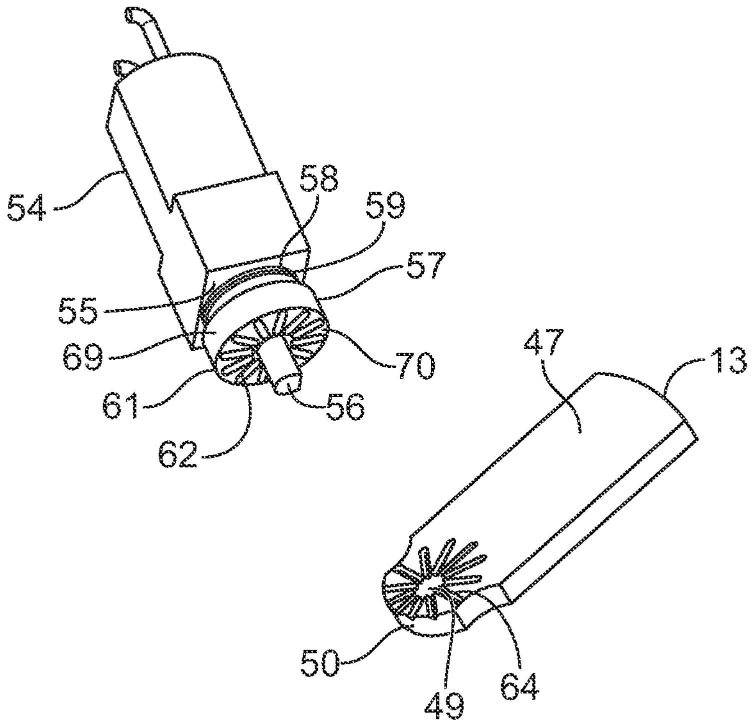
FIG. 23 is a stylized perspective view of the drive motor, slip clutch and cam of another embodiment of the cam lock.

In another embodiment, generally depicted in FIGS. 1-3 and 15-27, the pivotal electric cam lock 10 comprises a similar base 11 with a cap 22 secured to the actuator 20 extending from the base 11 preferably by a threaded fastener 21. The interior of the bottom of the cap 22 (FIGS. 19 and 21) has female square walls that complement the generally square shape of the male walls of the actuator 20 so that the cap 22 and cam 13 rotate about the first axis 67 with the actuator 20 when the screw 21 extends through the screw pocket 68 and into the threaded bore 65 of the actuator (FIG. 22). The cap 22 and cam 13 pivot about the first axis 67 upon the rotation of the actuator 20 with the rotation of the plug 19 in the mechanical lock 71 in the base bore 75 by turning a proper key 72 as described above. As seen in FIGS. 21 and 22, the screw also moves linearly in the screw pocket 68 to allow for clearance between the cam 13 and the end of the base 11.

In addition, the cam 13 can pivot radially by means of an electrical signal about a second axis 25 independent of a mechanical key. The top wall 45 of the cap 22 has a ledge 23 extending at a right angle to the axes 67 and 25 upon which the cam 13 pivotally rests. Similar to the earlier embodiment, the cam 13 is elongated and relatively flat with a first top side 47 away from the cap ledge 23, a second bottom side 48 that partially rests on the portion of the top wall 45 on the ledge 23. An aperture 49 extends from the first top side 47 to the second bottom side 48 near a first inner edge 50 of the cam 13. A bore 24, preferably blind, in the top wall 45 of the ledge 23 of the cap 22 is coaxial with the aperture 49 in the cam 13 and defines the second axis 25. In the embodiment shown in FIGS. 16-27, the second axis 25 is parallel to and offset from the first axis 67. However, in other embodiments the second axis 25 may be at a different angle, or may be coaxial with the first axis 67.

In one embodiment, a cover 52 is secured to the cap 22 by a pair of threaded fasteners 53. See FIG. 16. Sandwiched between the cover 52 and the cap 22 is an electric motor 54, such as a planetary motor or motor with an armature that upon receipt of an electric signal causes rotation of an output drive shaft 56. In other embodiments, the motor 54 may be mounted to and affixed to the cap 22 in other ways, such as being directly secured to the cap or by a cover 52 that attaches to the cap transversely by snaps or other means. The motor 54 is activated by an electric signal that may be carried by wires, or the electric signal may originate from a battery or other source of power associated with the motor, with the battery powered motor receiving a wireless signal for the battery to provide electrical energy to the motor 54. In any case, software may control the length, polarity and power of the electrical signal to the motor. The motor 54 has an end wall 55 and a drive shaft 56 protruding from the end wall 55. In one embodiment, the armature of the motor rotates about the second axis 25 upon the energization of the motor 54 by an electric signal.

In one embodiment, the motor 54 has a self-contained gearbox that reduces the rotational speed and increases the torque of the output or drive shaft 56, and the end wall 55 of the motor is actually an end wall of the gearbox. In another embodiment, the cover 52 or cap 22 may have a wall proximate the end wall 55 of the motor 54 or gearbox, and the drive shaft 56 extends through the cover or cap wall. Preferably, the drive shaft 56 has a non-circular outer diameter, for example a D shaped or star shaped outer diameter. See FIG. 23. In one embodiment, the diameters of the cam aperture 49 and the bore 24 in the cap are both sufficiently large and preferably circular to allow the drive shaft to rotate freely therein.

In a preferred embodiment, a slip clutch 57 is operatively connected to the drive shaft 56 to rotate therewith. The slip clutch has a bearing that preferably comprises a first relatively stationary or seat washer 58 around the drive shaft that has one side contacting the end wall 55 of the motor 54, gearbox, or outer wall of the motor pocket. On the other side of the first washer 58 is a second washer 59 also around the drive shaft that contacts the first washer on one side and a biasing means such as a spring 60 on the other side. Other common thrust bearings are contemplated as are other biasing means. The spring 60 is preferably helical and also surrounds the drive shaft 56 and contacts a first end wall 69 of a cylindrical skipper disc 61 urging a second end wall 70 of the skipper disc against the first side 47 of the cam 13. Preferably, a roughened surface 62 on the second side 70 of the skipper disc 61 complements the roughened surface 64 on the first side 47 of the cam proximate the aperture 49.

The skipper disc 61 has an aperture that is of complementary non-circular diameter to the drive shaft 56 so the disc 61 rotates with the drive shaft 56. The spring 60 biases the disc 61 against the top surface 47 of the cam 13. The surface 62 of the second end wall 70 of the disc 61 and the surface 64 of the cam immediately around the aperture 49 on its first top side 47 preferably have complementary roughened surfaces so that in the absence of a restraint to the cam, the cam 13 will also pivot about the second axis 25 with the rotation of the drive shaft 56.

In another embodiment, the motor sits in a pocket of the cover 52 and the thrust bearing and slip clutch 57 are sandwiched between a bottom surface of the cover 52 and the top surface 47 of the cam. As noted above, the motor drive system may also include a gearbox so that the drive shaft 56 rotates at a slower rate than the armature of the motor to provide more torque and less rotational speed to the drive shaft 56. In one embodiment, the gearbox may also provide a right angle between the input shaft and the drive shaft 56, so the motor can sit in a transverse direction to the second axis 25.

Figure 15A:
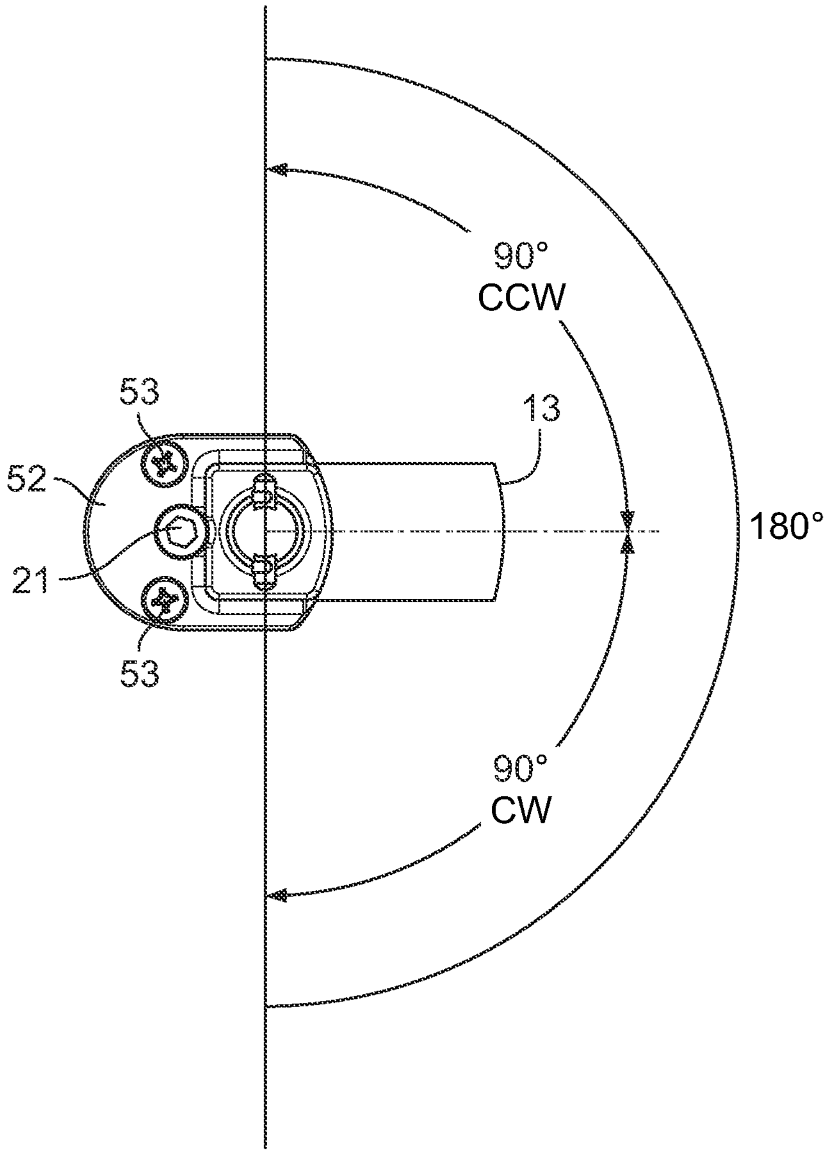
FIG. 15A is a top view of the cap and cover of another embodiment of the cam lock with the cam in the parallel extended condition depicting potential movement of the cam.
Figure 15B:
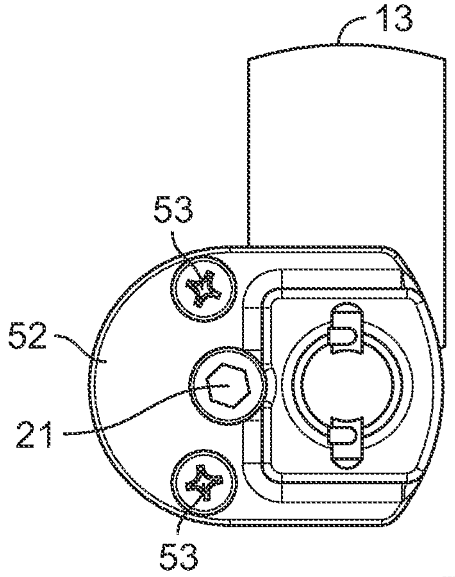
FIG. 15B is a top view of a cap and cover of another embodiment of the cam lock with the cam in a first right angle condition.
Figure 15C:
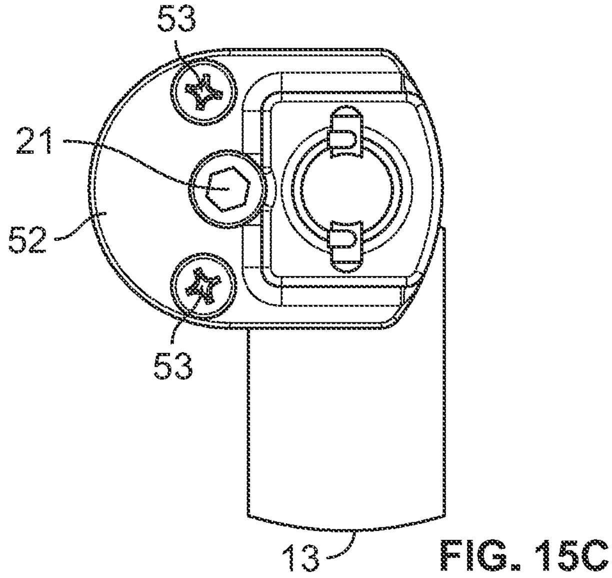
FIG. 15C is a top view of a cap and cover of another embodiment of the cam lock with the cam in a second right angle condition.
Figure 16:
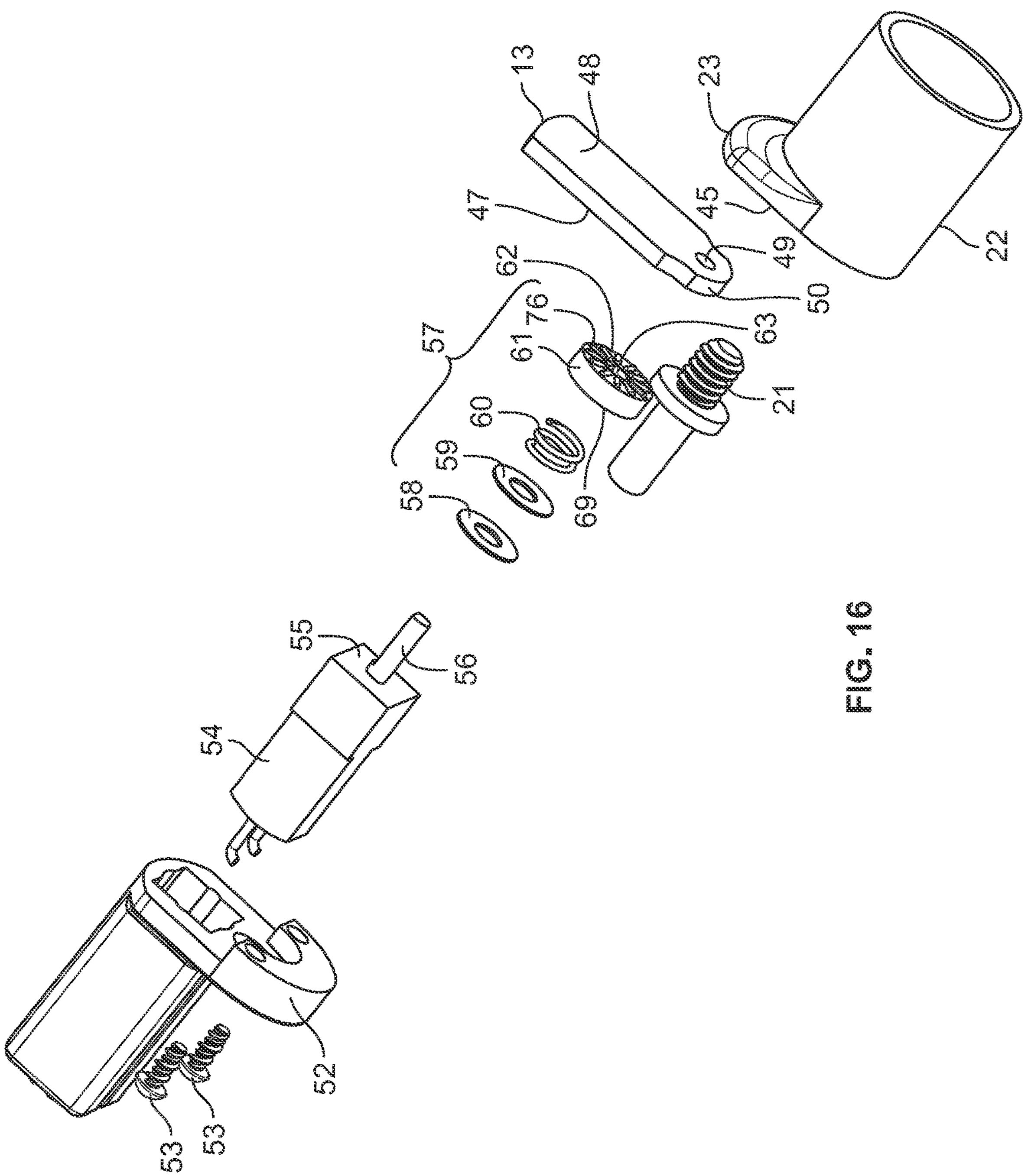
FIG. 16 is an exploded view of a cap and cover of another embodiment of the cam lock with the cam in the parallel extended condition.

As can be appreciated in FIGS. 15A-15C, depending on the electrical signal given to the motor 54, the cam can pivot or rotate 90° in either the clockwise or counter clockwise direction from the parallel condition for total pivotal motion of 180° in this embodiment depending on the electrical signal given to the motor. The inclusion of the slip clutch 57 in the assembly reduces the opportunity that the motor will burn out if the cam is obstructed in its path and the electrical signal is not properly terminated. The electrical signal to the motor 54 may be controlled in various ways. For example, software may be employed to control the electrical signal so that the signal may direct the motor to turn in one direction for a specific time, with the time period sufficient to rotate the cam 13 from a parallel to right angle creating a locked to unlocked condition or vice versa. Alternatively, magnetic, Hall Effect or other proximity sensors may be employed to verify that the cam 13 has moved to the proper angular position in response to the electrical signal to the motor to shut off the electrical signal. Additionally, an electrical signal may provide a visual or auditory warning to the operator that the cam 13 has or has not moved to the selected position. Alternatively, if the cam 13 is impeded in its range of pivoting, the slip clutch 57 may provide an auditory skipping sound to alert the operator that the cam is not sufficiently rotated, and the operator can possibly finish the operation by rotating the actuator 20 manually with a key 72.

Embodiments of the above-described devices, systems, and methods for remotely locking and unlocking vehicle accessory locks both manually and remotely through an electrical signal provide users a number of beneficial technical effects and a more desirable user experience as compared to known vehicle accessory locks. Such benefits include, without limitation, greater convenience, being less expensive and less time-consuming to install, being easier to operate and maintain, requiring fewer modifications to vehicles to which they are attached and/or to the vehicle accessories themselves, and making attaching the vehicle accessories to vehicles less likely to violate vehicle warranty conditions.

I claim:

1. A pivoting electrical cam lock comprising, a base with a cylindrical open bore having a first end and a second end and defining a first axis, a rotating mechanical lock in the bore having a keyway at one end proximate the bore first end and an actuator at the opposite end proximate the bore second end, the lock adapted so that when a proper key is inserted into the keyway and rotated, the lock and actuator rotate with the key in the base bore about the first axis, a cap fixed to the actuator and adapted to rotate about the first axis with the actuator and mechanical lock, the cap having a bore defining a second axis parallel to the first axis, a cam radially extending from the cap, the cam having a first side and a second side and a cylindrical aperture extending through the cam from the first side to the second side, with the aperture coaxial with the second axis, an electric motor fixed to the cap and having a rotating drive shaft extending outwardly therefrom, the drive shaft having a longitudinal axis coaxial with the second axis and extending into the cap second bore, with the drive shaft adapted to rotate in response to an electrical signal to the motor, a slip clutch connected to the drive shaft for rotation therewith, with one side of the slip clutch biased against the cam first side, wherein the cam pivots about the second axis in response to the electrical signal to the motor, and the cam pivots about the first axis with the cap upon rotation of the proper key in the mechanical lock.

2. The pivoting electrical cam lock of claim 1 wherein the second axis is offset from the first axis.

3. The pivoting electrical cam lock of claim 2 wherein the cap bore has a cylindrical diameter of sufficient size to allow the drive shaft to rotate therein, and the cam aperture has a diameter of sufficient size to allow the drive shaft to rotate therein.

4. The pivoting electrical cam lock of claim 3 wherein the cam first side has a roughened portion adjacent the aperture, and the slip clutch comprises a cylindrical skipper disc having a first end wall and a second end wall, with the skipper disc coaxial with the drive shaft and the aperture, with the second end wall of the skipper disc having a roughened surface that cooperates with the roughened surface on the cam first side to rotate the cam when the skipper disc second end wall is biased against the cam first side.

5. The pivoting electrical cam lock of claim 4 wherein the drive shaft has a non-circular outer diameter and the slip clutch skipper disc has an aperture extending from the first end wall to the second end wall, the aperture being of complementary shape to the drive shaft so the skipper disc rotates with the drive shaft.

6. The pivoting electrical cam lock of claim 5 wherein the cap has a shelf extending radially from the cap, the shelf having a first top wall and the cam second side contacts the shelf first top wall.

7. The pivoting electrical cam lock of claim 1 wherein the first and second axes are coaxial.

8. The pivoting electrical cam lock of claim 1 wherein the electrical signal to the motor is active for a set period.

9. The pivoting electrical cam lock of claim 1 wherein the angular position of the cam is monitored by a sensor.

10. The pivoting electrical cam lock of claim 1 wherein the biasing means is a spring.

11. The pivoting electrical cam lock of claim 10 wherein the spring is helical and coaxial with the drive shaft and is located between the motor the slip clutch.

12. The pivoting electrical cam lock of claim 1 wherein the cap bore is blind.

* * * * *